US012688676B2

(12) United States Patent
Ndiour et al.

(10) Patent No.: US 12,688,676 B2
(45) Date of Patent: Jul. 21, 2026

(54) OUT-OF-DISTRIBUTION DETECTION USING A NEURAL NETWORK

(71) Applicant: Intel Corporation, Santa Clara, CA (US)

(72) Inventors: Ibrahima Ndiour, Portland, OR (US);
Nilesh Ahuja, Cupertino, CA (US);
Ranganath Krishnan, Hillsboro, OR
(US); Mahesh Subedar, Portland, OR
(US); Omesh Tickoo, Portland, OR
(US); Ergin Genc, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/325,436

(22) Filed: May 30, 2023

(65) Prior Publication Data

US 2023/0298322 A1    Sep. 21, 2023

Related U.S. Application Data

(60) Provisional application No. 63/379,515, filed on Oct. 14, 2022.

(51) Int. Cl.
*G06V 10/77*        (2022.01)
*G06V 10/80*        (2022.01)
*G06V 10/82*        (2022.01)

(52) U.S. Cl.
CPC .......... *G06V 10/7715* (2022.01); *G06V 10/80* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 12,141,238 B2 * | 11/2024 | Sallee | G06N 3/0464 |
| 2019/0019061 A1 * | 1/2019 | Trenholm | G06F 18/2411 |
| 2022/0245422 A1 * | 8/2022 | Wu | G06N 3/04 |
| 2023/0230228 A1 * | 7/2023 | Liu | G06V 10/761 |
| 2025/0103898 A1 * | 3/2025 | Zhao | G06N 3/045 |

OTHER PUBLICATIONS

Zhou et al., "Anomaly Detection with Robust Deep Autoencoders," KDD 2017 Research paper, Aug. 13-17, 2017, Halifax, NS, Canada, 10 pages.

(Continued)

*Primary Examiner* — Leon Flores
(74) *Attorney, Agent, or Firm* — Akona IP PC

(57) ABSTRACT

Features extracted from one or more layers of a trained deep neural network (DNN) are used to detect out-of-distribution (OOD) data, such as anomalies. An OOD detection process includes transforming a feature output from a layer of the DNN from a relatively high-dimensional feature space to a lower-dimensional space, and then performing a reverse transformation back to the higher-dimensional feature space, resulting in a reconstructed feature. A feature reconstruction error is calculated based on a difference between the reconstructed feature and the original feature output from the DNN. The OOD detection process may further include calculating a score based on the feature reconstruction error and generating a visual representation of the feature reconstruction error.

20 Claims, 10 Drawing Sheets

(56) References Cited

OTHER PUBLICATIONS

Ahuja et al., Probabilistic Modeling of Deep Features for Out-of-Distribution and Adversarial Detection, arXiv:1909.11786v1 [stat. ML] Sep. 25, 2019, 10 pages.

Akcay et al., "GANomaly: Semi-Supervised Anomaly Detection via Adversarial Training," arXiv:1805.06725v3 [cs.CV] Nov. 13, 2018, 16 pages.

Baldi et al., "Neural Networks and Principal Component Analysis: Learning from Examples Without Local Minima," Neural Networks, vol. 2, pp. 53-58, 1989, 0893-6080/89, Copyright (c) 1989 Pergamon Press plc, 6 pages.

Bergman et al., "MVTec AD—A Comprensive Real-World Dataset for Unsupervised Anomaly Detection," Proceedings of the IEEE/CVF conference on computer vision and pattern recognition. 2019, 9 pages.

Bourlard et al., Auto-Association by Multilayer Perceptrons and Singular Value Decomposition, Biol. Cybern. 559, 291-294 (1988), Biological Cybernetics (c) Spring-Verlag 1988, 4 pages.

Catalin Ristea et al., "Self-Supervised Predictive Convolutional Attentive Block for Anomaly Detection," Proceedings of the IEEE/CVF conference on computer vision and pattern recognition. 2022, 11 pages.

Cohen et al., "Sub-Image Anomaly Detection with Deep Pyramid Correspondences," arXiv:2005.02357v3 [cs.CV] Feb. 3, 2021, 17 pages.

Defard et al., "PaDiM: a Patch Distribution Modeling Framework for Anomaly Detection and Localization," arXiv:2011.08785v1 [cs.CV] Nov. 17, 2020, 7 pages.

Denoeux et al., Principal Component Analysis of Fuzzy Data Using Auto-Associative Neural Networks, Universite de Technologie de Compiegne, U.M.R. Cnrs 6599 Heudiasyc, Centre de Recherches de Royalleiu, BP 20529-F-60205 Compiegne cedex, France, 33 pages.

Gal et al., "Dropout as a Bayesian Approximation", arXiv:1506.02157v5 [stat.ML] May 25, 2016, 20 pages.

Gong et al., "Memorizing Normality to Detect Anomaly: Memory-augmented Deep Autoencoder for Unsupervised Anomaly Detection," Proceedings of the IEEE/CVF international conference on computer vision. 2019, 10 pages.

Hendrycks et al., "A Baseline for Detecting Misclassified and Out-of-Distribution Examples in Neural Networks," arXiv:1610.02136v3 [cs.NE] Oct. 3, 2018, published as a conference paper at ICLR 2017, 12 pages.

Hendrycks et al., "Deep Anomaly Detection with Outlier Exposure," arXiv:1812.04606v3 [cs.LG] Jan. 28, 2019, published as a conference paper at ICLR 2019, 18 pages.

Kwon et al., "Novelty Detection Through Model-Based Characterization of Neural Networks", 27th IEEE International Conference on Image Processing (ICIP), Abu Dhabi, UAE, 2020, arXiv:2008.06094v1 [cs.CV] Aug. 13, 2020, 6 pages.

Lee et al., "A Simple Unified Framework for Detecting Out-of-Distribution Samples and Adversarial Attacks," 32nd Conference on Neural Information Processing Systems (NeurIPS 2018), Montreal, Canada, 11 pages.

Liang et al., "Enhancing the Reliability of Out-of-Distribution Image Detection in Neural Networks", arXiv:1706.02690v5 [cs. LG] Aug. 30, 2020, 15 pages.

Ndiour et al., "Subspace Modeling for Fast Out-of-Distribution and Anomaly Detection," arXiv:220310422v1 [cs.CV] Mar. 20, 2022, 5 pages.

Oord et al., Conditional Image Generation with Pixel CNN Decoders, 30th Conference on Neural Information Processing Systems (NIPS 2016), Barcelona, Spain, 9 pages.

Ren et al., "Likelihood Ratios for Out-of-Distribution Detection," 33rd Conference on Neural Information Processing Systems (NeurIPS 2019), Vancouver, Canada, 12 pages.

Roth et al., "Towards Total Recall in Industrial Anomaly Detection," Roth, Karsten, et al. "Towards total recall in industrial anomaly detection." Proceedings of the IEEE/CVF conference on computer vision and pattern recognition. 2022, 11 pages.

Rudolph et al., "Asymmetric Student-Teacher Networks for Industrial Anomaly Detection," Proceedings of the IEEE/CVF winter conference on applications of computer vision. 2023, 11 pages.

Rudolph et al., "Same Same But DifferNet: Semi-Supervised Defect Detection with Normalizing Flows," Proceedings of the IEEE/CVF winter conference on applications of computer vision. 2021, 10 pages.

Tenenbaum et al., "A Global Geometric Framework for Nonlinear Dimensionality Reduction", www.sciencemag.org, Science vol. 290, Dec. 22, 2000, 8 pages.

Zavrtanik et al., "DR/EM—A discriminatively training reconstruction embedding for surface anomaly detection," Proceedings of the IEEE/CVF international conference on computer vision. 2021, 10 pages.

* cited by examiner

500

Receive feature generated from input image from DNN
510

Apply forward transformation to feature
520

Perform reverse transformation
530

Calculate feature reconstruction error
540

Calculate detection score
550

Generate localization map
560

600

Receive training dataset
610

Learn forward transformation from training dataset
620

Calculate reverse transformation
630

OUT-OF-DISTRIBUTION DETECTION USING A NEURAL NETWORK

CROSS-REFERENCE TO RELATED APPLICATION

This application claims the benefit of U.S. Provisional Application No. 63/379,515, filed Oct. 14, 2022, which is incorporated by reference in its entirety.

TECHNICAL FIELD

This disclosure relates generally to neural networks, and more specifically, detecting out-of-distribution data using a neural network.

BACKGROUND

Deep Neural Networks (DNNs) can encounter out-of-distribution (OOD) data, which refers to input data that does not resemble in-distribution data for a particular model. For example, artificial intelligence (AI) models deployed in self-driving cars can receive data describing new terrains, objects, or weather that the models have not been trained on. Inputting OOD data into a DNN can lead to outputs that are unpredictable or unexplainable. It is useful to detect OOD data to prevent such outputs. As another example, in industrial processes, neural networks can be used to identify irregularities or defects. However, existing models for detecting OOD data rely on complex models that involve slow training processes run on complex or expensive hardware.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

General Overview

Figure 1:
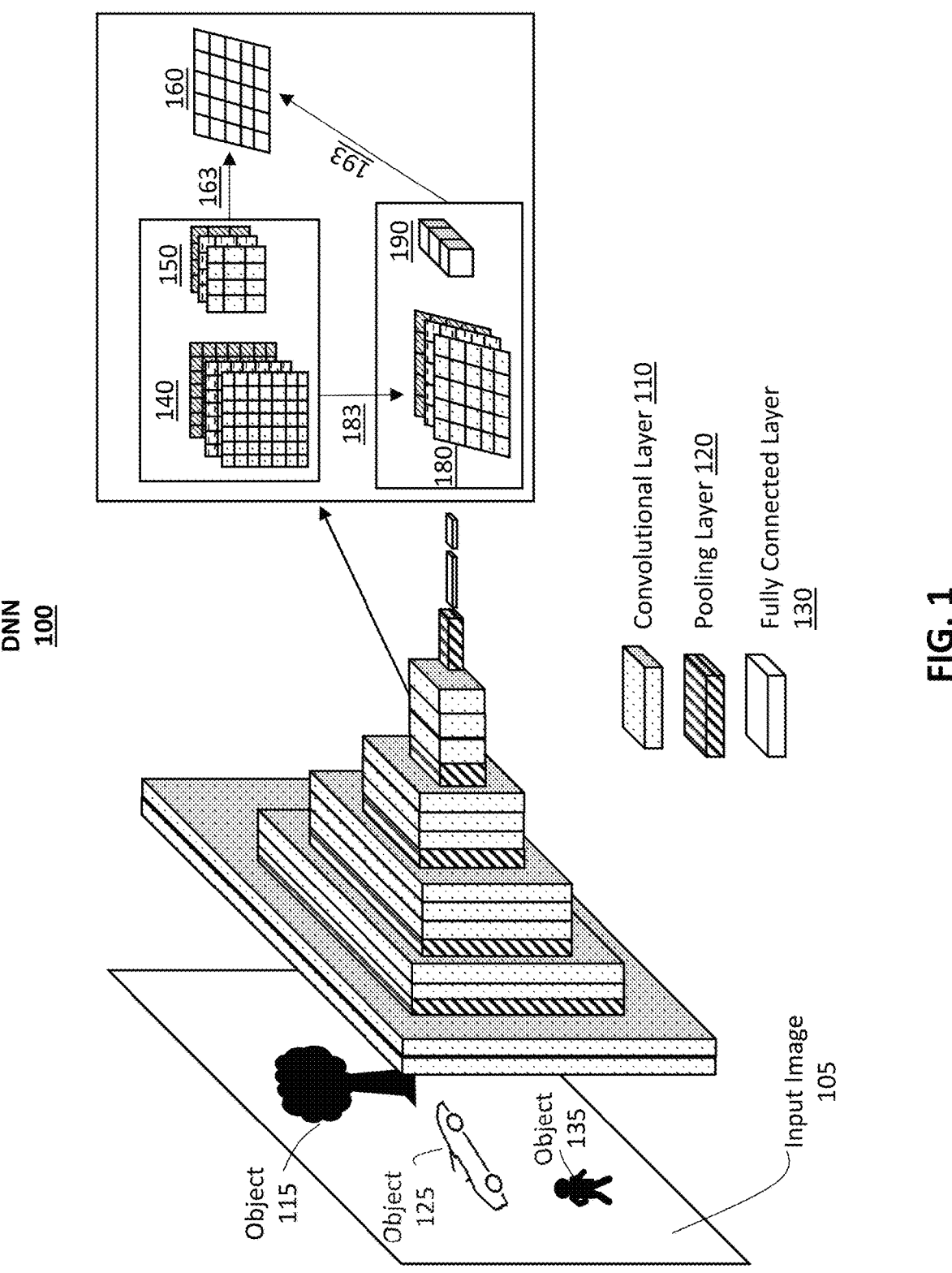
FIG. 1 illustrates an example DNN, in accordance with various embodiments.

DNNs deployed in real-world conditions may encounter out-of-distribution (OOD) data, which refers to input data that does not resemble in-distribution data for a particular DNN. In some cases, OOD data may be novel input data that does not resemble the training data used to train the DNN. For example, a DNN is trained to identify bananas based on images of bananas; if an image of an orange is input to the trained DNN, this image includes OOD data. Inputting OOD data to a DNN can lead to outputs that are unpredictable, which can lead to adverse outcomes. For instance, an AI model deployed in self-driving cars may encounter new terrains, objects, or weather that the AI model has not encountered before. The output of the AI model may lead to unpredictable outcomes and lead to incorrect driving behavior. The ability to detect OOD data can enable deployment of safe and transparent AI systems.

The general task of OOD detection can include different types of OOD detections for different use cases, such as multi-class OOD detection, which involves identifying data that does not match any class of a multi-class classification model; outlier detection, which may be used for DNNs trained using unlabeled datasets; and anomaly detection, which may be used for DNNs trained using only in-distribution examples. As used herein, OOD detection includes any detection of data that does not resemble in-distribution data, e.g., data that does not resemble the training data, data that does not match any class of a multi-class classifier, etc.

Anomaly detection is of particular interest for industrial applications. The goal of anomaly detection is to identify abnormal data, e.g., data that does not resemble training data, particularly in image data. In finely tuned industrial processes, such as precision manufacturing, abnormalities can be rare and can manifest in different ways. Anomaly detection can also be used for medical applications. For example, anomaly detection can be used to detect potential health problems in medical imaging, such as MRI scans.

Existing methods for OOD detection involve significant complexity during the training stage and/or the inference stage. For example, Bayesian neural networks and ensembles of discriminative classifiers provide good outcomes, but at the cost of complex model representations, and substantial computational and memory burdens. The modeling and hardware requirements to implement such BNN models are currently prohibitive for many real-world use cases. Other current methods use deep generative models (e.g., generative adversarial networks (GANs) or normalizing flows) to model the distribution of normal samples. These methods require expensive and complex model training.

The OOD detection process described here detects OOD data, such as anomalies, using a feature extracted from one or more layers of a trained DNN. The OOD detection process is significantly faster and less complex than prior processes, both during the training phase and during the OOD detection phase. The process includes transforming features output from a layer of the DNN from a relatively high-dimensional feature space to a lower-dimensional space, and then performing an inverse transformation back to the higher-dimensional feature space. A training data set is used to learn the forward transformation and the reverse transformation. A feature reconstruction error is calculated by subtracting the output of the inverse transformation from the original feature output from the DNN.

The feature reconstruction error may be used to calculate an OOD detection score that indicates whether the input image includes an OOD, e.g., an anomaly. The OOD detection score may be calculated as the $L_2$ norm of the difference between the original and reconstructed vectors. This score is an uncertainty estimate that is highly effective at discriminating in-distribution samples from OOD samples. For example, if an OOD detection score identifies OOD data (e.g., an input image has a detection score greater than a threshold), an OOD detection module may send a signal to a DNN module, which can provide an output indicating that a classification made by the DNN for the input image may be inaccurate.

The feature reconstruction error may additionally or alternatively be used to generate a localization map that can be mapped to the input image. The localization map can be visualized as an image in which the brightness or coloration of different pixels represents how a likelihood in the underlying that the pixel in the underlying input image represents an anomaly or other OOD data.

Unlike prior methods, the OOD detection method described herein can avoid training a new model (discriminative or generative), but instead can work on an existing DNN, including a DNN that was previously trained. The OOD detection method can operate on features from a single layer of the DNN, rather than a feature pyramid as required by some prior methods, and does not involve complex probabilistic modeling. The OOD detection method described herein can achieve a high degree of accuracy in identifying anomalies or other OOD data with low computational overhead, e.g., high framerate throughput on a central processing unit (CPU)-based system. Unlike prior methods, a graphical processing unit (GPU) or other complex or expensive hardware is not needed. This makes the method described herein attractive for deployment in real-world industrial usages on low-cost platforms.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN

FIG. 1 illustrates an example DNN 100, in accordance with various embodiments. For purpose of illustration, the DNN 100 in FIG. 1 is a CNN. In other embodiments, the DNN 100 may be other types of DNNs. The DNN 100 is trained to receive images and output classifications of objects in the images. In the embodiments of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers. In an inference of the DNN 100, the layers of the DNN 100 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 110 summarize the presence of features in the input image 105. The convolutional layers 110 function as feature extractors. The first layer of the DNN 100 is a convolutional layer 110. In an example, a convolutional layer 110 performs a convolution on an input tensor 140 (also referred to as input feature map (IFM) 140) and a filter 150. As shown in FIG. 1, the IFM 140 is represented by a 7×7×3 three-dimensional (3D) matrix. The IFM 140 includes 3 input channels, each of which is represented by a 7×7 two-dimensional (2D) matrix. The 7×7 2D matrix includes 7 input elements (also referred to as input points) in each row and 7 input elements in each column. The filter 150 is represented by a 3×3×3 3D matrix. The filter 150 includes 3 kernels, each of which may correspond to a different input channel of the IFM 140. A kernel is a 2D matrix of weights, where the weights are arranged in columns and rows. A kernel can be smaller than the IFM. In the embodiments of FIG. 1, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 150 in extracting features from the IFM 140.

The convolution includes MAC operations with the input elements in the IFM 140 and the weights in the filter 150. The convolution may be a standard convolution 163 or a depthwise convolution 183. In the standard convolution 163, the whole filter 150 slides across the IFM 140. All the input channels are combined to produce an output tensor 160 (also referred to as output feature map (OFM) 160). The OFM 160 is represented by a 5×5 2D matrix. The 5×5 2D matrix includes 5 output elements (also referred to as output points) in each row and 5 output elements in each column. For the purpose of illustration, the standard convolution includes one filter in the embodiment of FIG. 1. In embodiments where there are multiple filters, the standard convolution may produce multiple output channels in the OFM 160.

The multiplication applied between a kernel-sized patch of the IFM 140 and a kernel may be a dot product. A dot product is the elementwise multiplication between the kernel-sized patch of the IFM 140 and the corresponding kernel, which is then summed, always resulting in a single value. Because it results in a single value, the operation is often referred to as the "scalar product." Using a kernel smaller than the IFM 140 is intentional as it allows the same kernel (set of weights) to be multiplied by the IFM 140 multiple times at different points on the IFM 140. Specifically, the kernel is applied systematically to each overlapping part or kernel-sized patch of the IFM 140, left to right, top to bottom. The result from multiplying the kernel with the IFM 140 one time is a single value. As the kernel is applied multiple times to the IFM 140, the multiplication result is a 2D matrix of output elements. As such, the 2D output matrix (i.e., the OFM 160) from the standard convolution 163 is referred to as an OFM.

In the depthwise convolution 183, the input channels are not combined. Rather, MAC operations are performed on an individual input channel and an individual kernel and produce an output channel. As shown in FIG. 1, the depthwise convolution 183 produces a depthwise output tensor 180.

The depthwise output tensor 180 is represented by a 5×5×3 3D matrix. The depthwise output tensor 180 includes 3 output channels, each of which is represented by a 5×5 2D matrix. The 5×5 2D matrix includes 5 output elements in each row and 5 output elements in each column. Each output channel is a result of MAC operations of an input channel of the IFM 140 and a kernel of the filter 150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 193 is then performed on the depthwise output tensor 180 and a 1×1×3 tensor 190 to produce the OFM 160.

The OFM 160 is then passed to the next layer in the sequence. In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculate the convolution of each of them with each of the kernels. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 perform a convolution on the OFM 160 with new kernels and generates a new feature map. The new feature map may also be normalized and resized. The new feature map can be kernelled again by a further subsequent convolutional layer 110, and so on.

In some embodiments, a convolutional layer 110 has 4 hyperparameters: the number of kernels, the size F of the kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depthwise separable convolution, transposed convolution, and so on. The DNN 100 includes 16 convolutional layers 110. In other embodiments, the DNN 100 may include a different number of convolutional layers.

The pooling layers 120 down-sample feature maps generated by the convolutional layers, e.g., by summarizing the presence of features in the patches of the feature maps. A pooling layer 120 is placed between 2 convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer

120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receive an input operand. The input operand defines the output of the convolutional layers 110 and pooling layers 120 and includes the values of the last feature map generated by the last pooling layer 120 in the sequence. The fully connected layers 130 apply a linear combination and an activation function to the input operand and generate a vector. The vector may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and return an operand of size N, where N is the number of classes in the image classification problem. In the embodiments of FIG. 1, N equals 3, as there are 3 objects 115, 125, and 135 in the input image. Each element of the operand indicates the probability for the input image 105 to belong to a class. To calculate the probabilities, the fully connected layers 130 multiply each input element by weight, make the sum, and then apply an activation function (e.g., logistic if N=2, softmax if N>2). This is equivalent to multiplying the input operand by the matrix containing the weights. In an example, the vector includes 3 probabilities: a first probability indicating the object 115 being a tree, a second probability indicating the object 125 being a car, and a third probability indicating the object 135 being a person. In other embodiments where the input image 105 includes different objects or a different number of objects, the individual values can be different.

Example Convolution

Figure 2:
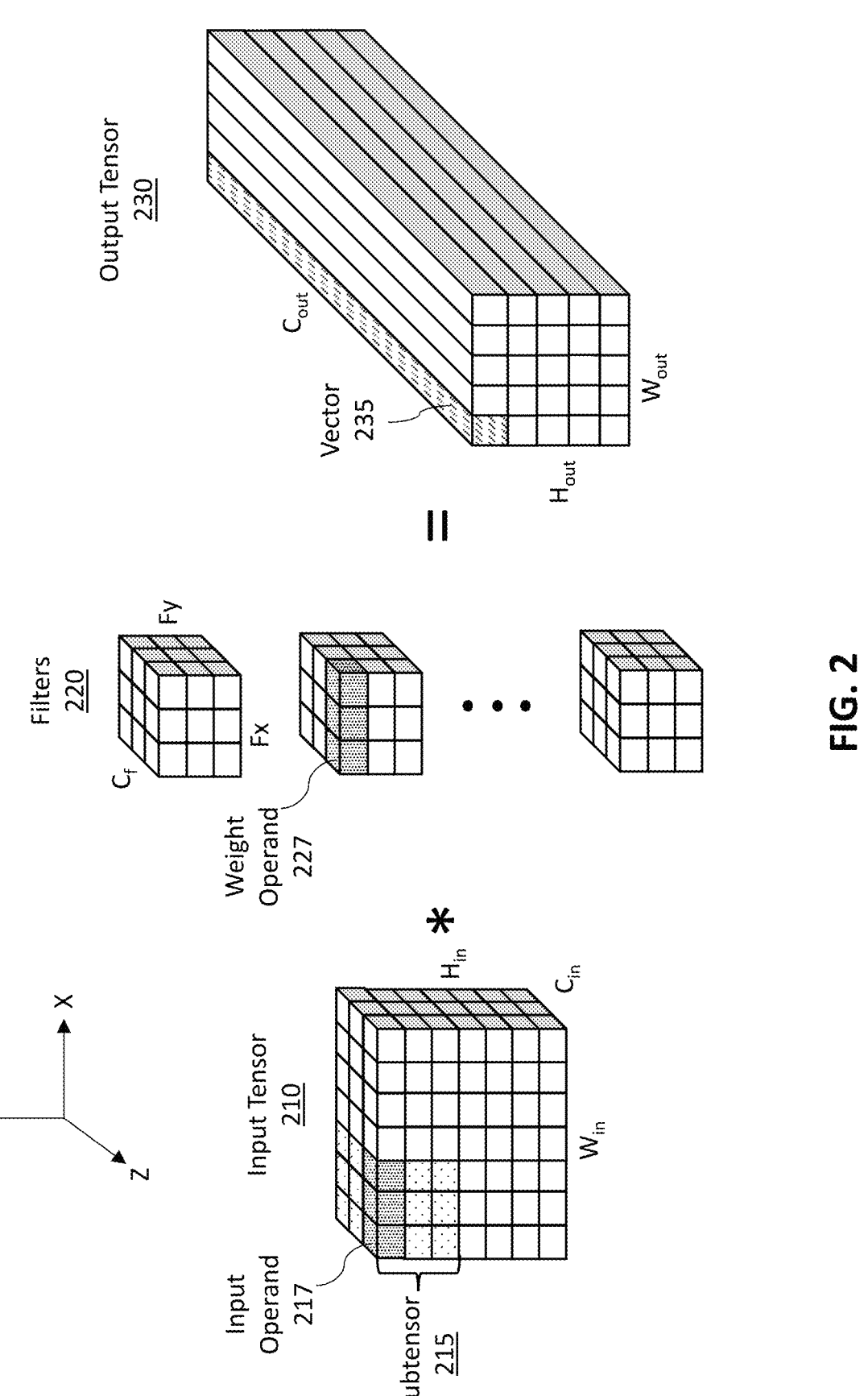
FIG. 2 illustrates an example convolution that may be performed by the DNN, in accordance with various embodiments.

FIG. 2 illustrates an example convolution, in accordance with various embodiments. The convolution may be a convolution in a convolutional layer of a DNN, e.g., a convolutional layer 110 in FIG. 1. The convolution can be executed on an input tensor 210 and filters 220 (individually referred to as "filter 220"). A result of the convolution is an output tensor 230.

In the embodiments of FIG. 2, the input tensor 210 includes activations (also referred to as "input activations," "elements," or "input elements") arranged in a 3D matrix. An input element is a data point in the input tensor 210. The input tensor 210 has a spatial size $H_{in} \times W_{in} \times C_{in}$, where $H_{in}$ is the height of the 3D matrix (i.e., the length along the Y axis, which indicates the number of activations in a column in the 2D matrix of each input channel), $W_{in}$ is the width of the 3D matrix (i.e., the length along the X axis, which indicates the number of activations in a row in the 2D matrix of each input channel), and $C_{in}$ is the depth of the 3D matrix (i.e., the length along the Z axis, which indicates the number of input channels). For purpose of simplicity and illustration, the input tensor 210 has a spatial size of 7×7×3, i.e., the input tensor 210 includes three input channels and each input channel has a 7×7 2D matrix. Each input element in the input tensor 210 may be represented by a (X, Y, Z) coordinate. In other embodiments, the height, width, or depth of the input tensor 210 may be different.

Each filter 220 includes weights arranged in a 3D matrix. The values of the weights may be determined through training the DNN. A filter 220 has a spatial size $H_f \times W_f \times C_f$, where $H_f$ is the height of the filter (i.e., the length along the Y axis, which indicates the number of weights in a column in each kernel), $W_f$ is the width of the filter (i.e., the length along the X axis, which indicates the number of weights in a row in each kernel), and $C_f$ is the depth of the filter (i.e., the length along the Z axis, which indicates the number of channels). In some embodiments, $C_f$ equals $C_{in}$. For purpose of simplicity and illustration, each filter 220 in FIG. 2 has a spatial size of 3×3×3, i.e., the filter 220 includes 3 convolutional kernels with a spatial size of 3×3. In other embodiments, the height, width, or depth of the filter 220 may be different. The spatial size of the convolutional kernels is smaller than the spatial size of the 2D matrix of each input channel in the input tensor 210.

An activation or weight may take one or more bytes in a memory. The number of bytes for an activation or weight may depend on the data format. For example, when the activation or weight has an integral format (e.g., INT8), the activation takes one byte. When the activation or weight has a floating-point format (e.g., FP16 or BF16), the activation or weight takes two bytes. Other data formats may be used for activations or weights.

In the convolution, each filter 220 slides across the input tensor 210 and generates a 2D matrix for an output channel in the output tensor 230. In the embodiments of FIG. 2, the 2D matrix has a spatial size of 5×5. The output tensor 230 includes activations (also referred to as "output activations," "elements," or "output element") arranged in a 3D matrix. An output activation is a data point in the output tensor 230. The output tensor 230 has a spatial size $H_{out} \times W_{out} \times C_{out}$, where How is the height of the 3D matrix (i.e., the length along the Y axis, which indicates the number of output activations in a column in the 2D matrix of each output channel), $W_{out}$ is the width of the 3D matrix (i.e., the length along the X axis, which indicates the number of output activations in a row in the 2D matrix of each output channel), and $C_{out}$ is the depth of the 3D matrix (i.e., the length along the Z axis, which indicates the number of output channels). $C_{out}$ may equal the number of filters 220 in the convolution. $H_{out}$ and $W_{out}$ may depend on the heights and weights of the input tensor 210 and each filter 220.

As a part of the convolution, MAC operations can be performed on a 3×3×3 subtensor 215 (which is highlighted with dot patterns in FIG. 2) in the input tensor 210 and each filter 220. The result of the MAC operations on the subtensor 215 and one filter 220 is an output activation. In some embodiments (e.g., embodiments where the convolution is an integral convolution), an output activation may include 8 bits, e.g., one byte. In other embodiments (e.g., embodiments where the convolution is a floating-point convolution), an output activation may include more than one byte. For instance, an output element may include two bytes.

After the MAC operations on the subtensor 215 and all the filters 220 are finished, a vector 235 is produced. The vector 235 is highlighted with slashes in FIG. 2. The vector 235 includes a sequence of output activations, which are arranged along the Z axis. The output activations in the vector 235 have the same (x,y) coordinate, but the output activations correspond to different output channels and have different Z coordinates. The dimension of the vector 235 along the Z axis may equal the total number of output channels in the output tensor 230.

After the vector 235 is produced, further MAC operations are performed to produce additional vectors till the output tensor 230 is produced. For instance, a filter 220 may move over the input tensor 210 along the X axis or the Y axis, and MAC operations can be performed on the filter 220 and another subtensor in the input tensor 210 (the subtensor has the same size as the filter 220). The amount of movement of a filter 220 over the input tensor 210 during different compute rounds of the convolution is referred to as the stride size of the convolution. The stride size may be 1 (i.e., the amount of movement of the filter 220 is one activation), 2 (i.e., the amount of movement of the filter 220 is two activations), and so on. The height and width of the output tensor 230 may be determined based on the stride size.

In some embodiments, the MAC operations on a 3×3×3 subtensor (e.g., the subtensor 215) and a filter 220 may be performed by a plurality of PEs. One or more PEs may receive an input operand (e.g., an input operand 217 shown in FIG. 2) and a weight operand (e.g., the weight operand 227 shown in FIG. 2). The input operand 217 includes a sequence of activations having the same (Y,Z) coordinate but different X coordinates. The weight operand 227 includes a sequence of weights having the same (Y,Z) coordinate but different X coordinates. The length of the input operand 217 is the same as the length of the weight operand 227. Activations in the input operand 217 and weights in the weight operand 227 may be sequentially fed into a PE. The PE may receive a pair of an activation and a weight at a time and multiple the activation and the weight. The position of the activation in the input operand 217 may match the position of the weight in the weight operand 227.

Example OOD Detection System

Figure 3:
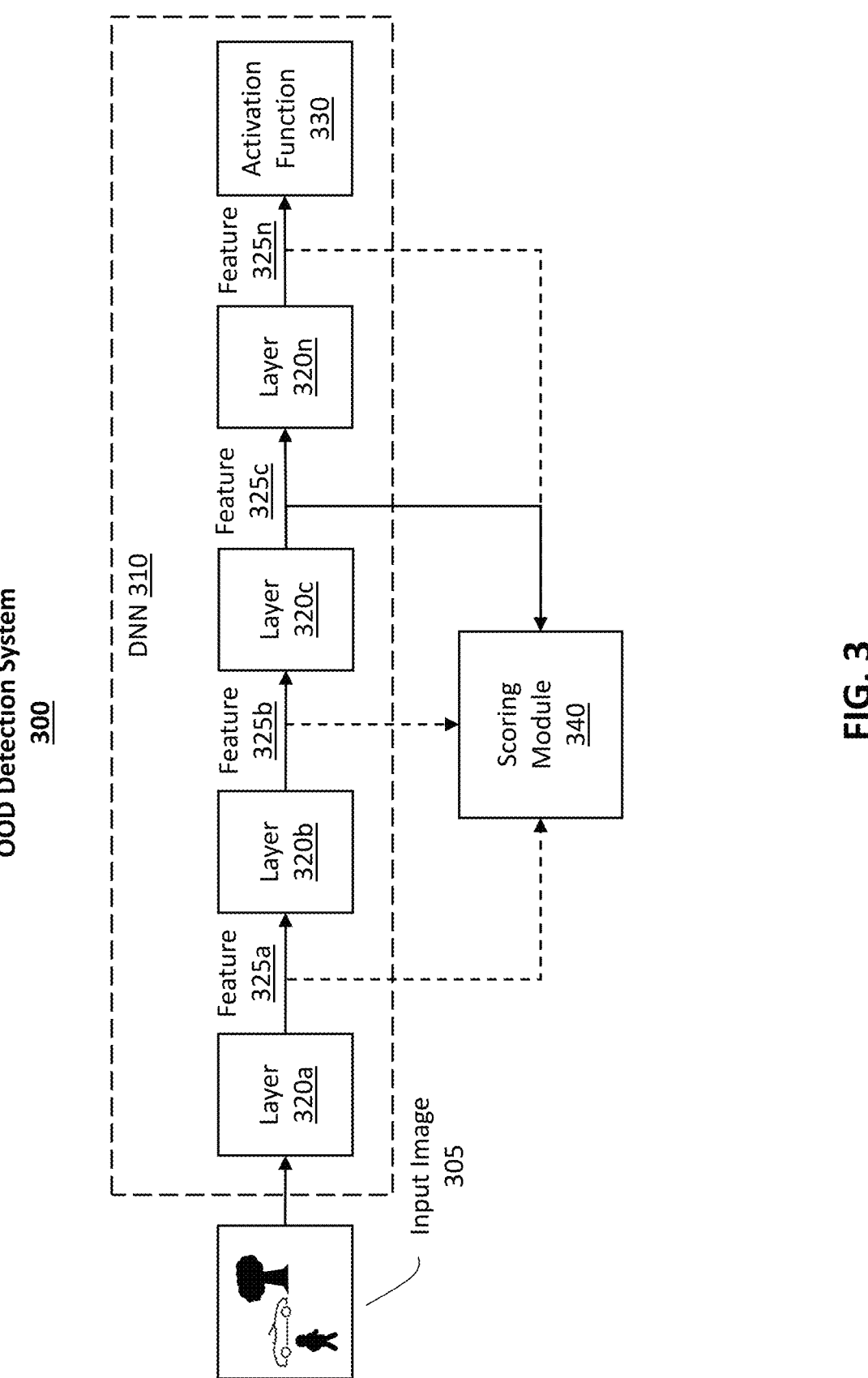
FIG. 3 illustrates an OOD detection system that includes a scoring module, in accordance with various embodiments.

FIG. 3 illustrates an OOD detection system 300 that includes a scoring module 340, in accordance with various embodiments. The OOD detection system 300 includes a DNN 310, which may be similar to the DNN 100 described with respect to FIG. 1. The DNN 310 includes multiple layers 320, including layer 320a, layer 320b, layer 320c, and layer 320n. The first layer 320a receives an input image 305, which may be similar to the input image 105. The DNN 310 may include any number N of the layers 320, e.g., one or more additional layers may be included between the layer 320c and the layer 320n. Each of the layers 320 may be a convolution layer 110, a pooling layer 120, or a fully connected layer 130, as described with respect to FIG. 1. In some examples, a particular layer 320 illustrated in FIG. 3

(e.g., the layer 320a) includes multiple processing layers of the DNN, e.g., a single layer 320 represented in FIG. 3 may include two or more convolution layers 110, or multiple layer types, e.g., one or more convolution layers 110 followed by a pooling layer 120, or a pooling layer 120 followed by one or more convolution layers 130.

The output of each of the layers 320 is a feature 325, e.g., the layer 320a outputs the feature 325a, the layer 320b outputs the feature 325b, etc. A feature 325 output by a layer 320 of the DNN 310 may also be referred to as a feature map, output feature map, or output tensor. For example, a feature 325 may be the OFM 160 described with respect to FIG. 1. As noted with respect to FIG. 1, an OFM 160 from a given layer is an IFM 140 to a subsequent layer, e.g., the feature 325b is output from the layer 320b (e.g., as an OFM 160) and input to the next layer 320c (e.g., as an IFM 140).

After the last layer 320n, an activation function 330 may be used to generate an output vector from the DNN 310 based on the feature 325n. For example, as described with respect to FIG. 1, the activation function 330 may be a logistic function if the DNN 310 performs a binary classification, or the activation function 330 may be a softmax function if the DNN 310 performs a multi-class classification.

One or more features 325 output from one or more of the layers 320 is provided to a scoring module 340. In the example shown in FIG. 1, the feature 325c output from the layer 320c is input to the scoring module 340, as indicated by the solid line. Any other feature 325 may additionally or alternatively input to the scoring module 340, as indicated by the dashed lines. In some embodiments, a feature map output from a single layer (e.g., the feature 325c from layer 320c) is output to the scoring module 340 to detect OOD data. In other embodiments, multiple feature maps output from multiple different layers (e.g., the feature 325a from layer 320a and the feature 325c from layer 320c) are output to the scoring module 340 to detect OOD data.

The scoring module 340 generates a low-dimensional representation of a received feature 325, reconstructs the low-dimensional representation in the original dimensions of the received feature 325, and then calculates an error between the original received feature 325 and the reconstructed feature. For example, the scoring module 340 performs a forward transformation of the feature 325 to generate a transformed feature, and then the scoring module 340 performs a reverse transformation of the transformed feature to generate a reconstructed feature. The scoring module 340 calculates a feature reconstruction error as a difference between the received feature 325 and the reconstructed feature. The feature reconstruction error may be a vector or, more generally, a tensor; the scoring module 340 may further compute a scalar detection score based on the feature reconstruction error. The scoring module 340 may additionally or alternatively generate a localization map of the feature reconstruction error that can be used to indicate visually a location of an anomaly or other OOD data in the input image 305.

The forward and reverse transformation are trained based on a training dataset that includes in-distribution data; if the feature 325 also represents in-distribution data, the reconstructed feature is expected to be close to the received feature 325. Thus, the feature reconstruction error between the reconstructed feature and the received feature 325 is expected to be low. On the other hand, if the feature 325 represents OOD data, the reconstructed feature may be different from the received feature 325, leading to a larger reconstruction error. The scoring module 340 is described in greater detail with respect to FIG. 4.

Example Scoring Module for OOD Detection System

Figure 4:
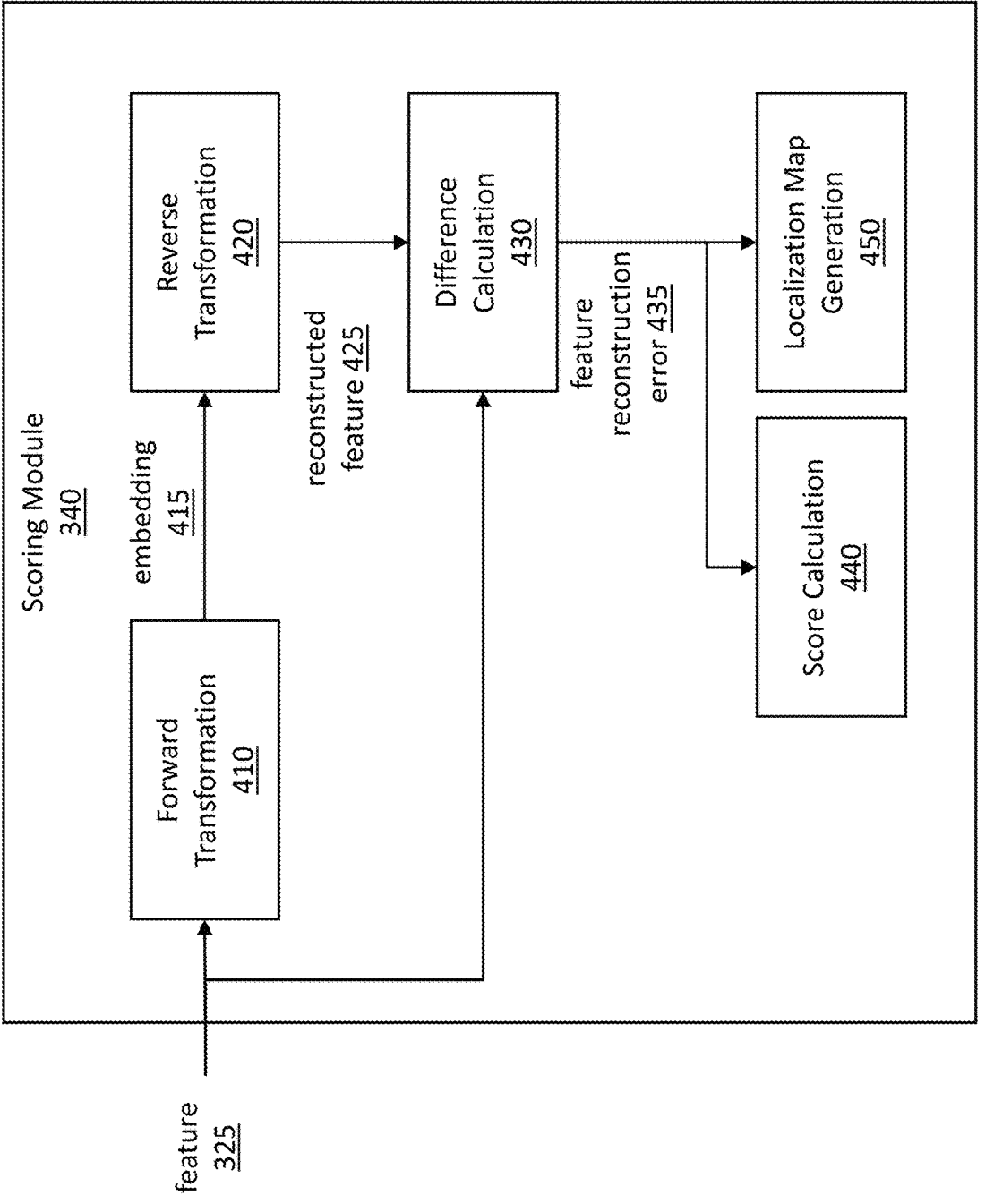
FIG. 4 is an example block diagram of the scoring module for OOD detection, in accordance with various embodiments.

FIG. 4 is an example block diagram of the scoring module for OOD detection, in accordance with various embodiments. The scoring module 340 inputs the feature 325 to a forward transformation block 410, which applies a forward transformation to the feature 325. The forward transformation block 410 applies a transformation to the feature 325 to project the feature 325 into a subspace having a lower dimension than the feature 325. The forward transformation may be a linear transformation, and in some cases, an orthogonal transformation. The space of the feature 325 and transformed space may each be a Euclidean space with a different number of dimensions. The transformed space may be considered a lower-dimension manifold embedded within the higher-dimensional space of the feature 325. The forward transformation is learned from a training dataset, as described in detail with respect to FIG. 6. The training dataset may be the same dataset used to train the DNN 310, or a different training dataset.

In general, the high dimensionality of the space of the feature 325 can make it challenging, both computationally and algebraically, to perform a variety of otherwise routine tasks on the features, e.g., leading to rank-deficiency in the data-matrix of the features. In the context of the intermediate features of a DNN (e.g., the feature 325 of the DNN 310), this implies that the features sparsely occupy the high-dimensional space they live in. Hence, the subspace spanned by the features can be accurately captured by appropriately mapping the original high-dimensional feature space to a reduced lower-dimensional subspace.

The forward transformation may substantially reduce the dimensionality of the feature 325. For example, if the feature 325 is the feature 325a output by the first layer 320a, the feature 325a may have 512 dimensions. The forward transformation may reduce the dimensionality to less than 50 dimensions, and in some cases, less than 30 dimensions, while retaining much of the information of the received feature 325 (e.g., at least 90%, at least 95%, or at least 99% of the information in the feature 325). At subsequent layers, the dimension reduction may be less substantial.

The output of the forward transformation block 410 is an embedding 415 in the lower-dimension space. An embedding refers to a vector in a multi-dimensional space, where each position of the vector is referred to as a dimension. As illustrated in FIG. 2, intermediate features may be represented as tensors, which may include vectors (i.e., tensors of rank 1), matrices (i.e., tensors of rank 2), and tensors of higher rank. If the feature 325 is represented as a tensor of rank 2 or greater, the forward transformation block 410, or a separate vectorization block, may vectorize the feature 325, which reshapes the higher-rank tensor into a vector. The forward transformation block 410 then generates an embedding (i.e., a vector) having a lower dimension than the vector representation of the feature 325. For example, the forward transformation block 410 may transform a 512-dimension embedding, i.e., a vector with 512 elements, into a 50-dimension embedding, i.e., a vector with 50 elements.

The embedding 415 is provided to a reverse transformation block 420, which applies a reverse transformation, also referred to as an inverse transformation, to the embedding 415. In some embodiments, the reverse transformation is a pseudo-inverse of the forward transformation. For example, the reverse transformation may be the Moore-Penrose pseudo-inverse of the forward transformation. The reverse transformation block 420 applies the reverse transformation to the embedding 415 to project the embedding 415 into the same subspace as the feature 325. The reverse transformation is not uniquely defined in the higher-dimension space of the feature 325, so the original feature 325 cannot be recovered by the reverse transformation. The reverse transformation is also learned from a training dataset, as described in detail with respect to FIG. 6. The output of the reverse transformation block 420 is the reconstructed feature 425. The reconstructed feature 425 may be a vector having the same dimension as the feature 325, and in particular, the vectorized feature (if the original feature 325 is a tensor of rank 2 or greater).

Both the reconstructed feature 425 and the feature 325 are provided to a difference calculation block 430, which calculates a difference between the feature 325 and the reconstructed feature 425. For example, the difference calculation block 430 may calculate an element-by-element difference between the feature 325 and the reconstructed feature 425, resulting in a vector having the same size as the feature 325 and as the reconstructed feature 425. This vector is the feature reconstruction error 435, and represents the error in the reconstruction of the original feature 325 through the forward and reverse transformation blocks 410 and 420.

The feature reconstruction error 435 is a multi-dimensional vector, which may be difficult for a user to interpret, or difficult for a computer (e.g., an automated quality control check on a manufacturing line) to interpret. To make the feature reconstruction error 435 more interpretable, the feature reconstruction error 435 can be provided to a score calculation block 440 to calculate a score based on the feature reconstruction error 435 and/or a localization map generation block 450 to generate a visual map of the feature reconstruction error 435.

More specifically, the score calculation block 440 calculates a detection score, which is a scalar value, from the feature reconstruction error 435. For example, the score calculation block 440 may calculate the detection score as the L2 norm, also referred to as the Euclidean norm or 2-norm, of the feature reconstruction error 435. The L2 norm is defined as the square root of the sum of the squares of the individual elements of the feature reconstruction error 435. The detection score may be compared to a threshold to decide whether the input image includes OOD data. The threshold may be particular to a given process, e.g., an industrial process, a medical image review process, a manufacturing process, etc.

The localization map generation block 450 generates a localization map that indicates where, in the input image, the anomaly or other OOD data may be located. The localization map may be output to a user, e.g., as an overlay on the input image or in a side-by-side display with the input image. The localization map highlights one or more portions in the input image where the image data appears to be out of the expected distribution (e.g., irregular or anomalous). For example, the localization map may be visualized as a heat map where one color (e.g., yellow or red) indicates pixels where OOD data is detected, and another color (e.g., blue) indicates pixels where OOD data is not detected.

To generate the localization map, the localization map generation block 450 may rearrange the feature reconstruction error 435 from a vector to a tensor of higher rank, and in particular, a tensor having the same shape as the feature 325. This tensor may be referred to as the error tensor. The localization map generation block 450 may then perform channel-wise averaging of the error tensor to generate the localization map.

For example, the feature 325 is particular feature k, referred to as $f_k$, and has a shape $C_k \times H_k \times W_k$, where $C_k$ is a number of channels of $f_k$, and $H_k$ and $W_k$ are the height and width of each channel. The channel-wise averaging can be performed below, producing a single-channel error localization map M of size $H_k \times W_k$:

$$M_k(i, j) = \frac{1}{C_k} \sum_{c=1}^{C_k} e(c, i, j)$$

The localization map generation block 450 may further resize the localization map to match the dimensions of the input image, so that the localization map can be displayed over the input image or alongside the input image for convenient comparison. In some cases, the resizing may be performed by a different module, e.g., a component outside the scoring module 340.

In some embodiments, the scoring module 340 or a separate module of the OOD detection system 300 can combine error localization maps based on features output at multiple layers of the DNN. In such embodiments, an error combiner block (not shown in FIG. 4) may be included in the scoring module 340 or outside the scoring module, e.g., an error combiner may receive multiple feature reconstruction errors computed by the scoring module 340, or multiple localization maps computed by the scoring module. In some embodiments, the OOD detection system 300 includes multiple scoring modules 340 associated with different layers of the DNN 310, e.g., a first scoring module that receives the feature 325*b*, and a second scoring module that receives the feature 325*c*. These scoring modules may each output their respective feature reconstruction errors and/or localization maps to an error combiner to combine the errors into a single score and/or a single map. An example process performed by the error combiner is described with respect to FIG. 7.

Example Process for OOD Detection

Figure 5:
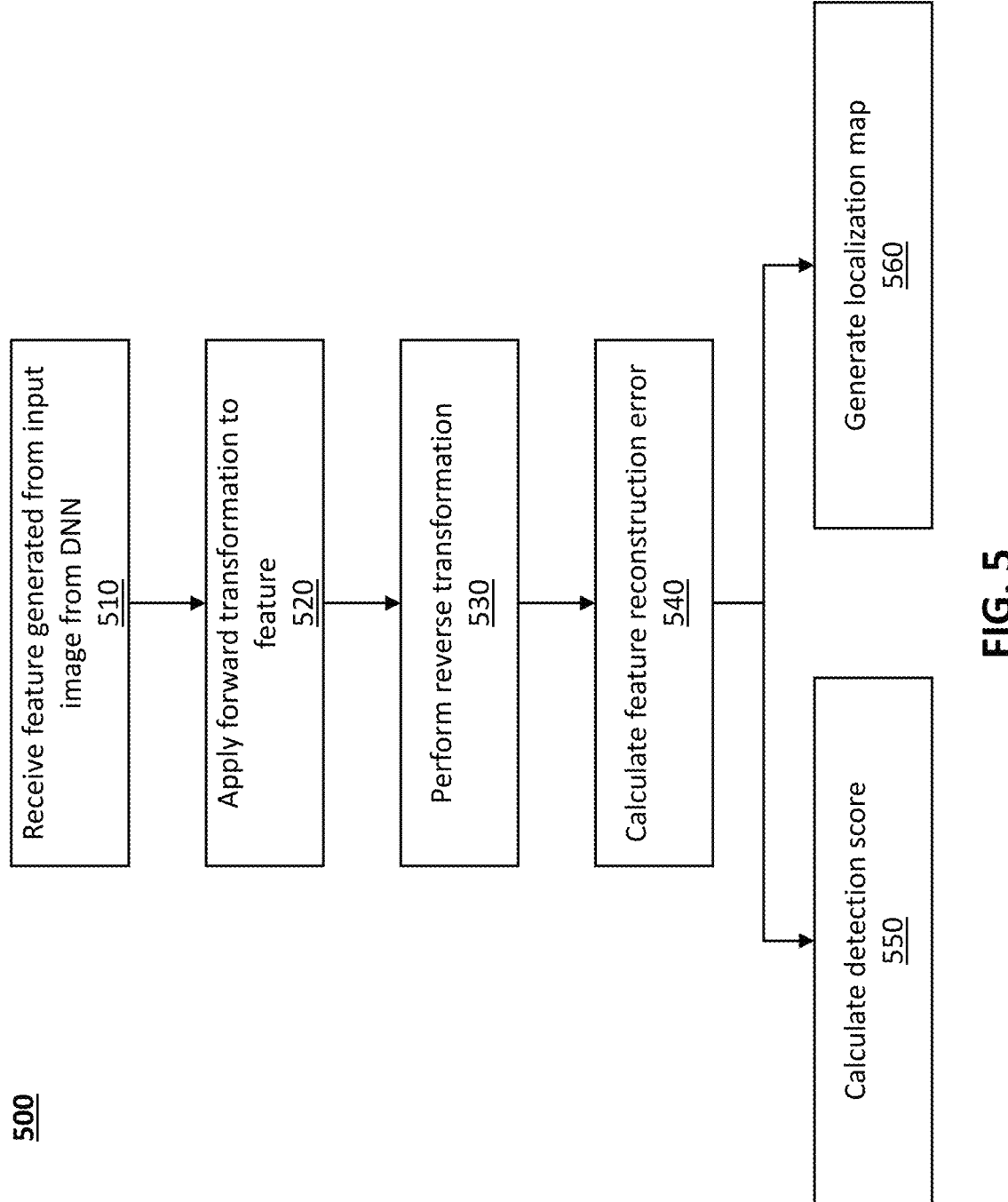
FIG. 5 is a flowchart illustrating a process for OOD detection, in accordance with various embodiments.

FIG. 5 is a flowchart illustrating a process 500 for OOD detection, in accordance with various embodiments. In different embodiments, the process 500 may be performed by any computing device, including a general-purpose CPU.

An OOD detection system 300 (e.g., the scoring module 340) receives 510 a feature generated based on an input image, e.g., the input image 305, from a DNN, e.g., the DNN 310. For example, as shown in FIG. 3, the scoring module 340 receives the feature 325*c* generated by the layer 320*c* of the DNN 310.

The OOD detection system 300 (e.g., the forward transformation block 410 of the scoring module 340) applies 520 a forward transformation to the feature. The forward transformation may reduce a dimensionality of the feature 325*c*, e.g., to produce an embedding having a lower dimension than the feature 325*c*. The forward transformation may be learned from a training dataset, as described with respect to FIG. 6.

The OOD detection system 300 (e.g., the reverse transformation block 420 of the scoring module 340) performs 530 a reverse transformation on the embedding resulting from the forward transformation. The reverse transformation results in a reconstructed feature, which may be of the same size as the feature 325*c* (or as a vector representation of the feature 325*c*).

The OOD detection system 300 (e.g., the difference calculation block 430 of the scoring module 340) calculates

540 a feature reconstruction error, e.g., as a difference between the reconstructed feature and the original feature 325*c*.

The OOD detection system 300 (e.g., the score calculation block 440 of the scoring module 340) may calculate 550 a detection score based on the feature reconstruction error. For example, the detection score may be calculated as an L2 norm of the feature reconstruction error, as described with respect to FIG. 4.

The OOD detection system 300 (e.g., the localization map generation block 450 of the scoring module 340) generates 560 a localization map based on the feature reconstruction error. For example, the localization map generation block 450 may perform channel-wise averaging of an error tensor generated by reshaping the feature reconstruction error, as described with respect to FIG. 4.

Example Process for Learning Forward and Reverse Transformations

Figure 6:
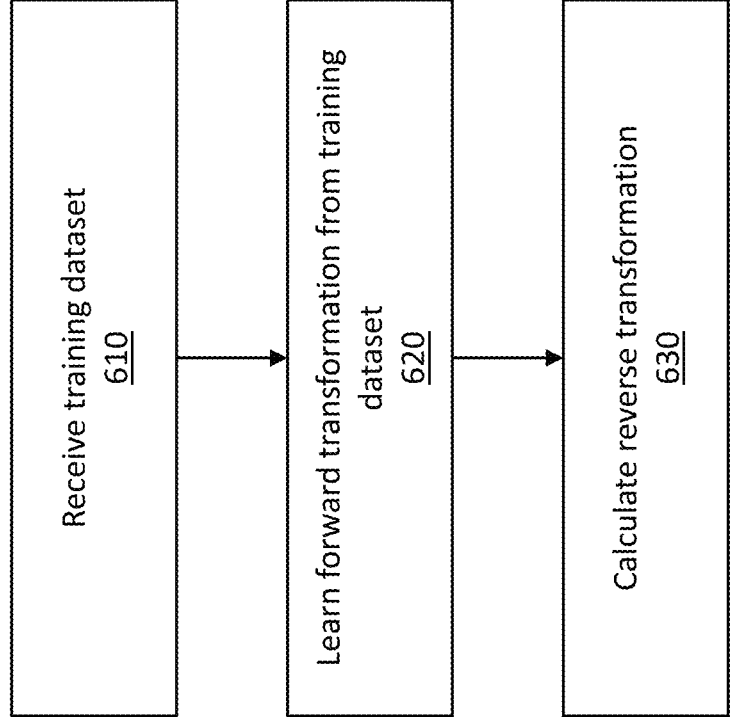
FIG. 6 is a flowchart illustrating a process for learning forward and reverse transformations, in accordance with various embodiments.

FIG. 6 is a flowchart illustrating a process for learning forward and reverse transformations, in accordance with various embodiments. In different embodiments, the process 600 may be performed by any computing device, including a general-purpose CPU. The process 600 may be performed by an OOD training module within a system for training the DNN 100 or 310, e.g., the DNN system 2140 described with respect to FIG. 8 or the DNN system 2200 described with respect to FIG. 9. FIG. 9 includes an example OOD training module 2270 in the DNN system 2200. Alternatively, the process 600 may be performed by an OOD training module that is separate from the DNN training, e.g., if the OOD detection is performed on a pre-trained DNN.

The OOD training module receives 610 a training dataset. The training dataset generally includes in-distribution images or data describing in-distribution images. The training dataset may not be labelled. The training dataset may be the same training dataset used to train the underlying DNN or a different training dataset.

The OOD training module learns 620 a forward transformation from the training dataset. The learned forward transformation is provided to the forward transformation block 410, described with respect to FIG. 4. In some embodiments, the forward transformation is learned by principal component analysis (PCA). PCA is a statistical technique used to reduce the dimensionality of a dataset by finding the underlying patterns and correlations among the variables. PCA works by identifying the principal components, which are linear combinations of the original variables that capture the most variation in the data. A first principal component accounts for a greatest amount of variance in the data, and each subsequent component accounts for as much of the remaining variance as possible.

In some embodiments, including those where PCA is used, the forward transformation may be calculated based on a singular value decomposition (SVD) of a training dataset. SVD is a matrix factorization technique that decomposes an original data matrix into three matrices: the left singular vectors, the singular values, and the right singular vectors. The principal components can then be obtained from the singular vectors and values. In other embodiments, rather than SVD, other methods for PCA may be used, such as eigenvalue decomposition (EVD), which involves decomposing the covariance matrix of the original data into eigenvectors and eigenvalues.

Linear methods such as PCA can effectively model certain subspaces, e.g., if the underlying data is normally distributed. Features output by later layers in a DNN (e.g., layer 320*c* or 320*n*) may be more likely to be normally distributed than features out by earlier layers (e.g., layer 320*a* or 320*b*). In some embodiments, including situations where data in the feature 325 may not be normally distributed, the data may be modeled as living in a lower-dimensional sub-manifold. In one example, kernel PCA (kPCA) is used to model the underlying non-linear structure of the data. kPCA is a nonlinear extension of PCA that is often more efficient than other manifold learning methods such as Isomap or locally linear embedding (LLE). In other examples, the forward transformation may be learned using any nonlinear manifold learning technique that provides an explicit mapping function for new data points.

The forward transformation may be trained in a short amount of time (e.g., less than 5 minutes, less than 1 minute, less than 30 seconds, less than 10 seconds, or less than 5 seconds) depending on the size of the training dataset, the complexity of the DNN, and computational power of the hardware. As noted above, the forward transformation may be trained using a standard processing unit, e.g., a CPU, rather than specialized hardware.

The OOD detection training module calculates 630 a reverse transformation. The reverse transformation is provided to the reverse transformation block 420, described with respect to FIG. 4. The reverse transformation may be calculated based on the learned forward transformation, e.g., by calculating a pseudo-inverse of the forward transformation. For example, the OOD detection training module may calculate the Moore-Penrose pseudo-inverse, also referred to as a general pseudo-inverse, of the forward transformation to use as the reverse transformation. Alternatively, a SVD method or another method may be used to calculate the pseudo-inverse.

Example Process for Combining Error Localization Maps

Figure 7:
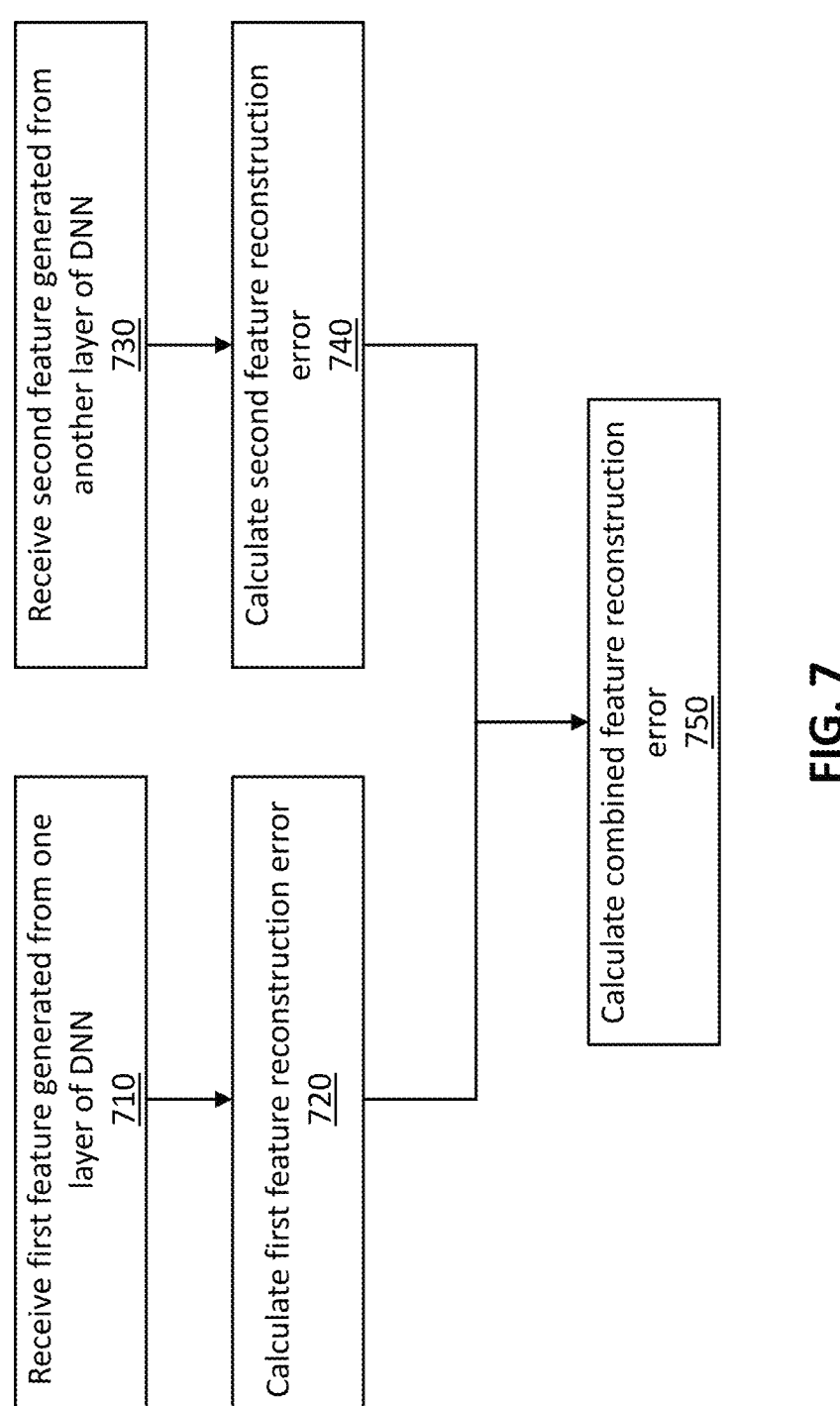
FIG. 7 is a flowchart illustrating a process for combining multiple error localization maps, in accordance with various embodiments.

FIG. 7 is a flowchart illustrating a process for combining multiple error localization maps, in accordance with various embodiments. In different embodiments, the process 700 may be performed by any computing device, including a general-purpose CPU. The process 700 may be performed by an OOD detection system, such as the OOD detection system 300. As described with respect to FIG. 4, in some embodiments, the scoring module 340 may be configured to calculate feature reconstruction errors for intermediate features from multiple layers of a DNN 310, or multiple scoring modules 340 may be included; the scoring module 340 or an error combiner can then combine the multiple localization maps.

The OOD detection system 300 (e.g., the scoring module 340) receives 710 a first feature generated from one layer of a DNN, e.g., the DNN 310. For example, the scoring module 340 receives the feature 325*a* generated by the layer 320*a* of the DNN 310.

The OOD detection system 300 (e.g., the scoring module 340) generates 720 a first localization map. For example, the scoring module performs a forward transformation and reverse transformation to generate a first reconstructed feature, calculates the first feature reconstruction error as a difference between the first feature and the first reconstructed feature, and generates a first localization map based on the first feature reconstruction error, as described with respect to FIGS. 4 and 5.

The OOD detection system 300 (e.g., the scoring module 340, or a second scoring module) receives 730 a second feature generated from another layer of the DNN, e.g., the DNN 310. For example, the scoring module 340 receives the feature 325*c* generated by the layer 320*c* of the DNN 310.

The OOD detection system 300 (e.g., the scoring module 340, or the second scoring module) calculates 740 a second localization map. For example, the scoring module performs a forward transformation and reverse transformation to generate a second reconstructed feature, calculates the second feature reconstruction error as a difference between the second feature and the second reconstructed feature, and generates a second localization map based on the second feature reconstruction error, as described with respect to FIGS. 4 and 5.

In FIG. 7, the processes 310 and 320 are illustrated as being performed in parallel with the processes 730 and 740. As shown in FIG. 3, the DNN 310 may generate the first feature (e.g., the feature 325*a*) prior to generating the second feature (e.g., the feature 325*c*), but the scoring module 340 may operate on the two features in parallel, as illustrated, or alternately may operate on the two feature sequentially.

The OOD detection system 300 (e.g., an error combiner) generates 750 a combined localization map from the first and second localization maps. For example, the error combiner calculates a pixel-wise geometric average of the localization maps. One or both of the localization maps may first be resized (e.g., by the error combiner, the scoring module 340, or a separate visualization module) to the size of the input image or to another size. While the process 700 describes combining two feature reconstruction errors, more generally, any number of localization maps generated based on features output from a corresponding number of DNN layers may be calculated and combined using a similar process. The pixel-wise geometric average of the localization maps can be calculated as follows:

$$M_{comb} = \prod_{k=1}^{n} (M_k)^{1/n}$$

Example Deep Learning Environment

Figure 8:
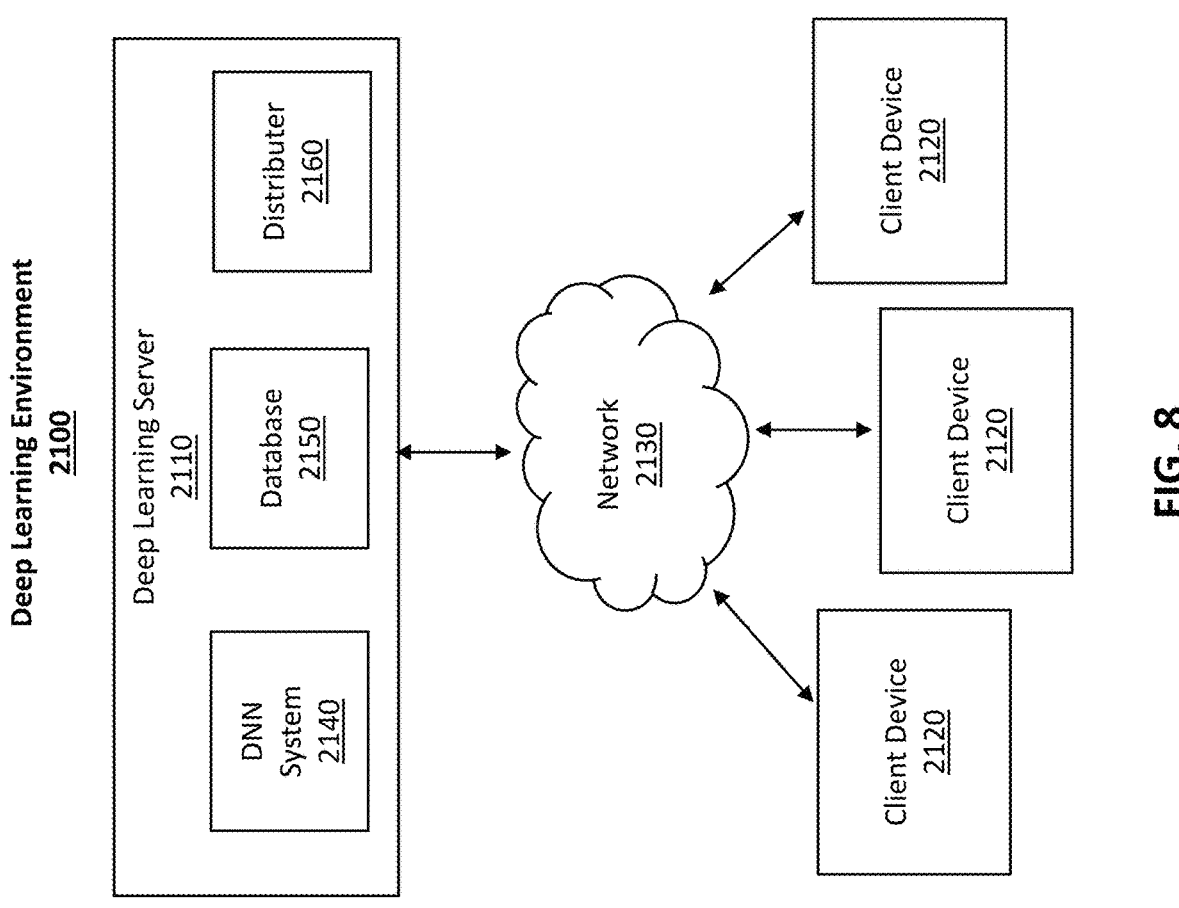
FIG. 8 illustrates a deep learning environment, in accordance with various embodiments.
Figure 9:
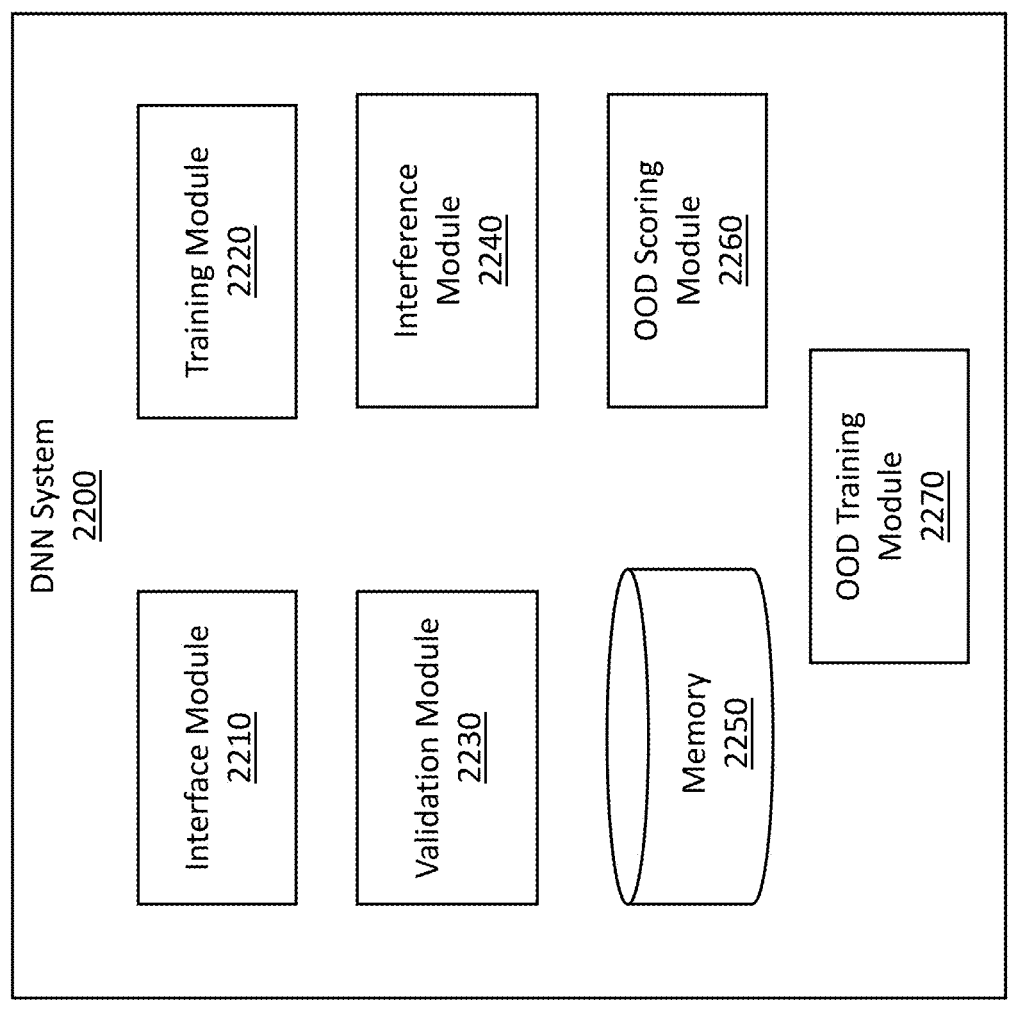
FIG. 9 is a block diagram of an example DNN system, in accordance with various embodiments.

FIG. 8 illustrates a deep learning environment 2100, in accordance with various embodiments. The deep learning environment 2100 includes a deep learning server 2110 and a plurality of client devices 2120 (individually referred to as client device 2120). The deep learning server 2110 is connected to the client devices 2120 through a network 2130. In other embodiments, the deep learning environment 2100 may include fewer, more, or different components.

The deep learning server 2110 trains deep learning models using neural networks. A neural network is structured like the human brain and consists of artificial neurons, also known as nodes. These nodes are stacked next to each other in 3 types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The deep learning server 2110 can use various types of neural networks, such as DNN, CNN, recurrent neural network (RNN), generative adversarial network (GAN), long short-term memory network (LSTMN), and so on. During the process of training the deep learning models, the neural networks use unknown elements in the input distribution to extract features, group objects, and discover useful data patterns. The deep learning models can be used to solve various problems, e.g., making predictions, classifying images, and so on. The deep learning server 2110 may build deep learning models specific to particular types of problems that need to be solved. A deep learning model is trained to receive an input and outputs the solution to the particular problem. In particular, the deep learning server 2110 may build the DNN 310.

In FIG. 8, the deep learning server 2110 includes a DNN system 2140, a database 2150, and a distributer 2160. The DNN system 2140 trains DNNs. The DNNs can be used to process images, e.g., images captured by autonomous vehicles, medical devices, satellites, and so on. In an embodiment, a DNN receives an input image and outputs classifications of objects in the input image. Examples of the DNN include the DNN 100 and the DNN 310 described above in conjunction with FIGS. 1 and 3, respectively. In some embodiments, the DNN system 2140 trains DNNs through knowledge distillation, e.g., dense-connection based knowledge distillation. The trained DNNs may be used on low memory systems, like mobile phones, IOT edge devices, and so on.

The database 2150 stores data received, used, generated, or otherwise associated with the deep learning server 2110. For example, the database 2150 stores a training dataset that the DNN system 2140 uses to train DNNs. In an embodiment, the training dataset is an image gallery that can be used to train a CNN for classifying images. The training dataset may include data received from the client devices 2120. As another example, the database 2150 stores hyperparameters of the neural networks built by the deep learning server 2110.

The distributer 2160 distributes deep learning models generated by the deep learning server 2110 to the client devices 2120. In some embodiments, the distributer 2160 receives a request for a DNN from a client device 2120 through the network 2130. The request may include a description of a problem that the client device 2120 needs to solve. The request may also include information of the client device 2120, such as information describing available computing resource on the client device. The information describing available computing resource on the client device 2120 can be information indicating network bandwidth, information indicating available memory size, information indicating processing power of the client device 2120, and so on. In an embodiment, the distributer may instruct the DNN system 2140 to generate a DNN in accordance with the request. The DNN system 2140 may generate a DNN based on the information in the request. For instance, the DNN system 2140 can determine the structure of the DNN and/or train the DNN in accordance with the request.

In another embodiment, the distributer 2160 may select the DNN from a group of pre-existing DNNs based on the request. The distributer 2160 may select a DNN for a particular client device 2120 based on the size of the DNN and available resources of the client device 2120. In embodiments where the distributer 2160 determines that the client device 2120 has limited memory or processing power, the distributer 2160 may select a compressed DNN for the client device 2120, as opposed to an uncompressed DNN that has a larger size. The distributer 2160 then transmits the DNN generated or selected for the client device 2120 to the client device 2120.

In some embodiments, the distributer 2160 may receive feedback from the client device 2120. For example, the distributer 2160 receives new training data from the client device 2120 and may send the new training data to the DNN system 2140 for further training the DNN. As another example, the feedback includes an update of the available computing resource on the client device 2120. The distributer 2160 may send a different DNN to the client device 2120 based on the update. For instance, after receiving the feedback indicating that the computing resources of the client device 2120 have been reduced, the distributer 2160 sends a DNN of a smaller size to the client device 2120.

The client devices 2120 receive DNNs from the distributer 2160 and applies the DNNs to perform machine learning tasks, e.g., to solve problems or answer questions. In various embodiments, the client devices 2120 input images into the DNNs and use the output of the DNNs for various applications, e.g., visual reconstruction, augmented reality, robot localization and navigation, medical diagnosis, weather prediction, and so on. A client device 2120 may be one or more computing devices capable of receiving user input as well as transmitting and/or receiving data via the network 2130. In one embodiment, a client device 2120 is a conventional computer system, such as a desktop or a laptop computer. Alternatively, a client device 2120 may be a device having computer functionality, such as a personal digital assistant (PDA), a mobile telephone, a smartphone, an autonomous vehicle, or another suitable device. A client device 2120 is configured to communicate via the network 2130. In one embodiment, a client device 2120 executes an application allowing a user of the client device 2120 to interact with the deep learning server 2110 (e.g., the distributer 2160 of the deep learning server 2110). The client device 2120 may request DNNs or send feedback to the distributer 2160 through the application. For example, a client device 2120 executes a browser application to enable interaction between the client device 2120 and the deep learning server 2110 via the network 2130. In another embodiment, a client device 2120 interacts with the deep learning server 2110 through an application programming interface (API) running on a native operating system of the client device 2120, such as IOS® or ANDROID™.

In an embodiment, a client device 2120 is an integrated computing device that operates as a standalone network-enabled device. For example, the client device 2120 includes display, speakers, microphone, camera, and input device. In another embodiment, a client device 2120 is a computing device for coupling to an external media device such as a television or other external display and/or audio output system. In this embodiment, the client device 2120 may couple to the external media device via a wireless interface or wired interface (e.g., an HDMI (High-Definition Multimedia Interface) cable) and may utilize various functions of the external media device such as its display, speakers, microphone, camera, and input devices. Here, the client device 2120 may be configured to be compatible with a generic external media device that does not have specialized software, firmware, or hardware specifically for interacting with the client device 2120.

The network 2130 supports communications between the deep learning server 2110 and client devices 2120. The network 2130 may comprise any combination of local area and/or wide area networks, using both wired and/or wireless communication systems. In one embodiment, the network 2130 may use standard communications technologies and/or protocols. For example, the network 2130 may include communication links using technologies such as Ethernet, 21010.11, worldwide interoperability for microwave access (WiMAX), 3G, 4G, code division multiple access (CDMA), digital subscriber line (DSL), etc. Examples of networking protocols used for communicating via the network 2130 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 2130 may be represented using any suitable format, such as hypertext markup language (HTML) or extensible markup language (XML). In some embodiments, all or some of the communication links of the network 2130 may be encrypted using any suitable technique or techniques.

Example DNN System

FIG. 9 is a block diagram of an example DNN system 2200, in accordance with various embodiments. The whole DNN system 2200 or a part of the DNN system 2200 may be implemented in the computing device 2300 in FIG. 10. The DNN system 2200 trains DNNs for various tasks, such as image classification, learning relationships between biological cells (e.g., DNA, proteins, etc.), control behaviors for devices (e.g., robots, machines, etc.), and so on. The DNN system 2200 includes an interface module 2210, a training module 2220, a validation module 2230, an inference module 2240, and a memory 2250.

In this example, the DNN system 2200 further includes an OOD scoring module 2260, which may be similar to the scoring module 340 described above, and an OOD training module 2270, which may train the OOD scoring module 2260 (e.g., learning the forward transformation and reverse transformation) as described with respect to FIG. 6.

In other embodiments, alternative configurations, different or additional components may be included in the DNN system 2200. Further, functionality attributed to a component of the DNN system 2200 may be accomplished by a different component included in the DNN system 2200 or a different system. The DNN system 2200 or a component of the DNN system 2200 (e.g., the training module 2220 or inference module 2240) may include the computing device 2300.

The interface module 2210 facilitates communications of the DNN system 2200 with other systems. For example, the interface module 2210 establishes communications between the DNN system 2200 with an external database to receive data that can be used to train DNNs or input into DNNs to perform tasks. As another example, the interface module 2210 supports the DNN system 2200 to distribute DNNs to other systems, e.g., computing devices configured to apply DNNs to perform tasks.

The training module 2220 trains DNNs by using a training dataset. The training module 2220 forms the training dataset. In an embodiment where the training module 2220 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 2230 to validate performance of a trained DNN. The portion of the training dataset not including the tuning subset and the validation subset may be used to train the DNN.

The training module 2220 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset.

The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 22, 220, 500, 2200, or even larger.

The training module 2220 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 2220 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 2220 defines the architecture of the DNN, the training module 2220 inputs a training dataset into the DNN. The training dataset includes a plurality of training samples. An example of a training sample includes an object in an image and a ground-truth label of the object. The training module 2220 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 2220 uses a cost function to minimize the error.

The training module 2220 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 2220 finishes the predetermined number of epochs, the training module 2220 may stop updating the parameters in the DNN. The DNN having the updated parameters is referred to as a trained DNN.

The validation module 2230 verifies accuracy of trained DNNs. In some embodiments, the validation module 2230 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 2230 may determine an accuracy score measuring the precision, recall, or a combination of precision and recall of the DNN. The validation module 2230 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 2230 may compare the accuracy score with a threshold score. In an example where the validation module 2230 determines that the accuracy score of the augmented model is lower than the threshold score, the validation module 2230 instructs the training module 2220 to re-train the DNN. In one embodiment, the training module 2220 may iteratively re-train the DNN until the occurrence of a stopping condition, such as the accuracy measurement indication that the DNN may be sufficiently accurate, or a number of training rounds having taken place.

The inference module 2240 applies the trained or validated DNN to perform tasks. For instance, the inference module 2240 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 2240 distributes the DNN to other systems, e.g., computing devices in communication with the DNN system 2200, for the other systems to apply the DNN to perform the tasks.

The memory 2250 stores data received, generated, used, or otherwise associated with the DNN system 2200. For example, the memory 2250 stores the datasets used by the training module 2220 and validation module 2230. The memory 2250 may also store data generated by the training module 2220 and validation module 2230, such as the hyperparameters for training DNNs, internal parameters of trained DNNs (e.g., values of tunable parameters of activation functions, such as Fractional Adaptive Linear Units (FALUs)), etc. In the embodiment of FIG. 9, the memory 2250 is a component of the DNN system 2200. In other embodiments, the memory 2250 may be external to the DNN system 2200 and communicate with the DNN system 2200 through a network.

Example Computing Device

Figure 10:
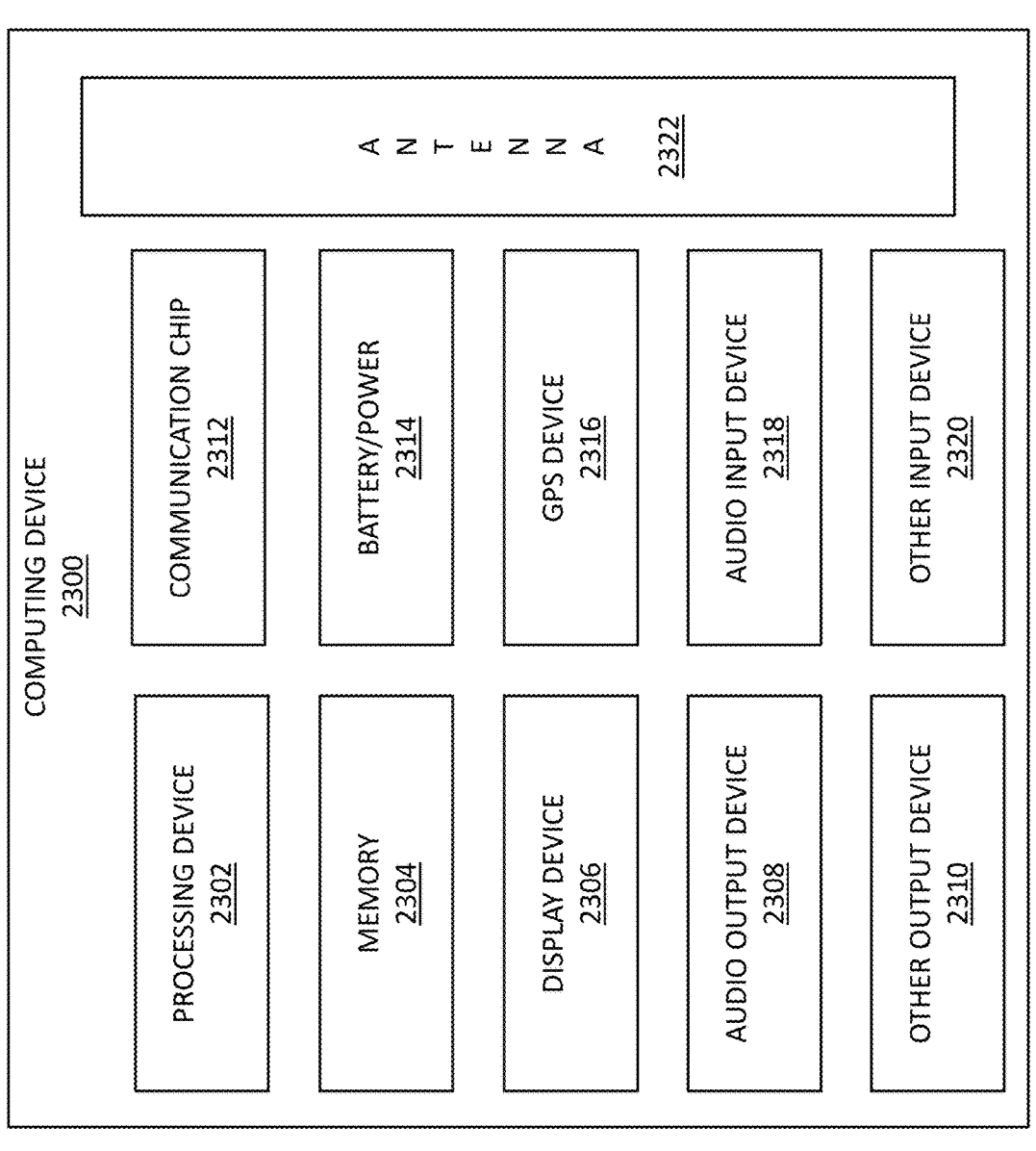
FIG. 10 is a block diagram of an example computing device, in accordance with various embodiments.

FIG. 10 is a block diagram of an example computing device 2300, in accordance with various embodiments. In some embodiments, the computing device 2300 can be used as the DNN system 2200 in FIG. 9. A number of components are illustrated in FIG. 10 as included in the computing device 2300, but any one or more of these components may be omitted or duplicated, as suitable for the application. In some embodiments, some or all of the components included in the computing device 2300 may be attached to one or more motherboards. In some embodiments, some or all of these components are fabricated onto a single system on a chip (SoC) die. Additionally, in various embodiments, the computing device 2300 may not include one or more of the components illustrated in FIG. 10, but the computing device 2300 may include interface circuitry for coupling to the one or more components. For example, the computing device 2300 may not include a display device 2306, but may include display device interface circuitry (e.g., a connector and driver circuitry) to which a display device 2306 may be coupled. In another set of examples, the computing device 2300 may not include an audio input device 2318 or an audio output device 2308, but may include audio input or output device interface circuitry (e.g., connectors and supporting circuitry) to which an audio input device 2318 or audio output device 2308 may be coupled.

The computing device 2300 may include a processing device 2302 (e.g., one or more processing devices). The processing device 2302 processes electronic data from registers and/or memory to transform that electronic data into other electronic data that may be stored in registers and/or memory. The computing device 2300 may include a memory 2304, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 2304 may include memory that shares a die with the processing device 2302. In some embodiments, the memory 2304 includes one or more non-transitory computer-readable media storing instructions executable to perform operations for deep learning, e.g., some operations performed by the DNN 100 or the DNN 310 described above in conjunction with FIGS. 1 and 3. In some embodiments, the memory 2304 includes one or more non-transitory computer-readable media storing instructions executable to perform operations for performing OOD detection and/or training an OOD detector, e.g., any of the processes 500, 600, and 700 described with respect to FIGS. 5-7. The instructions stored in the one or more non-transitory computer-readable media may be executed by the processing device 2302.

In some embodiments, the computing device 2300 may include a communication chip 2312 (e.g., one or more communication chips). For example, the communication chip 2312 may be configured for managing wireless communications for the transfer of data to and from the computing device 2300. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 2312 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 2312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 2312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2312 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2312 may operate in accordance with other wireless protocols in other embodiments. The computing device 2300 may include an antenna 2322 to facilitate wireless communications and/or to receive other wireless communications (such as AM or FM radio transmissions).

In some embodiments, the communication chip 2312 may manage wired communications, such as electrical, optical, or any other suitable communication protocols (e.g., the Ethernet). As noted above, the communication chip 2312 may include multiple communication chips. For instance, a first communication chip 2312 may be dedicated to shorter-range wireless communications such as Wi-Fi or Bluetooth, and a second communication chip 2312 may be dedicated to longer-range wireless communications such as global positioning system (GPS), EDGE, GPRS, CDMA, WiMAX, LTE, EV-DO, or others. In some embodiments, a first communication chip 2312 may be dedicated to wireless communications, and a second communication chip 2312 may be dedicated to wired communications.

The computing device 2300 may include battery/power circuitry 2314. The battery/power circuitry 2314 may include one or more energy storage devices (e.g., batteries or capacitors) and/or circuitry for coupling components of the computing device 2300 to an energy source separate from the computing device 2300 (e.g., AC line power).

The computing device 2300 may include a display device 2306 (or corresponding interface circuitry, as discussed above). The display device 2306 may include any visual indicators, such as a heads-up display, a computer monitor, a projector, a touchscreen display, a liquid crystal display (LCD), a light-emitting diode display, or a flat panel display, for example.

The computing device 2300 may include an audio output device 2308 (or corresponding interface circuitry, as discussed above). The audio output device 2308 may include any device that generates an audible indicator, such as speakers, headsets, or earbuds, for example.

The computing device 2300 may include an audio input device 2318 (or corresponding interface circuitry, as discussed above). The audio input device 2318 may include any device that generates a signal representative of a sound, such as microphones, microphone arrays, or digital instruments (e.g., instruments having a musical instrument digital interface (MIDI) output).

The computing device 2300 may include a GPS device 2316 (or corresponding interface circuitry, as discussed above). The GPS device 2316 may be in communication with a satellite-based system and may receive a location of the computing device 2300, as known in the art.

The computing device 2300 may include another output device 2310 (or corresponding interface circuitry, as discussed above). Examples of the other output device 2310 may include an audio codec, a video codec, a printer, a wired or wireless transmitter for providing information to other devices, or an additional storage device.

The computing device 2300 may include another input device 2320 (or corresponding interface circuitry, as discussed above). Examples of the other input device 2320 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 2300 may have any desired form factor, such as a handheld or mobile computer system (e.g., a cell phone, a smart phone, a mobile internet device, a music player, a tablet computer, a laptop computer, a netbook computer, an ultrabook computer, a PDA, an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 2300 may be any other electronic device that processes data.

SELECT EXAMPLES

The following paragraphs provide various examples of the embodiments disclosed herein. Example 1 includes a computer-implemented method that includes receiving an output feature map output by an intermediate layer of a neural network, the neural network including a first layer to receive a representation of an input image and at least one intermediate layer following the first layer; applying a forward transformation to the output feature map to generate an embedding, the forward transformation reducing a dimensionality of the output feature map; performing a reverse transformation of the embedding to generate a reconstructed feature map, the reconstructed feature map having a same dimensionality as the output feature map; determining a feature reconstruction error representing a difference between the output feature map and the reconstructed feature map; and determining a detection score based on the feature reconstruction error, the detection score indicating whether the input image includes out-of-distribution data.

Example 2 provides the computer-implemented method of example 1, where applying the forward transformation to the output feature map to generate the embedding includes performing an orthogonal linear transformation on the output feature map, the orthogonal linear transformation calculated from a training dataset using principal component analysis.

Example 3 provides the computer-implemented method of example 1, where applying the forward transformation to the output feature map to generate the embedding includes applying a transformation learned from a training dataset using a nonlinear manifold learning technique.

Example 4 provides the computer-implemented method of example 1, where applying the forward transformation to the output feature map to generate the embedding includes vectorizing the output feature map to generate a vectorized feature, the vectorized feature having a lower rank than the output feature map; and reducing a dimensionality of the vectorized feature to generate the embedding, where the embedding has fewer elements than the vectorized feature.

Example 5 provides the computer-implemented method of example 1, where performing the reverse transformation of the embedding includes applying a pseudo-inverse of the forward transformation to the embedding, where the pseudo-inverse has a same dimensionality as the output feature map.

Example 6 provides the computer-implemented method of example 1, the method further including generating a localization map of the feature reconstruction error, the localization map having dimensions corresponding to the input image, the localization map indicating where, in the input image, the out-of-distribution data is located.

Example 7 provides the computer-implemented method of example 6, where the feature reconstruction error is an error vector, and generating the localization map of the feature reconstruction error includes rearranging the error vector to an error tensor, the error tensor having a same dimension as the output feature map; performing a channel-wise averaging of the error tensor to generate the localization map; and resizing the localization map to match the dimensions of the input image.

Example 8 provides the computer-implemented method of example 6, the method further including determining a second feature reconstruction error based on a second output feature map, the second output feature map obtained from an output of a second intermediate layer of the neural network; generating a second localization map of the second feature reconstruction error; and combining the localization map and the second localization map into a combined error localization map.

Example 9 provides the computer-implemented method of example 8, where combining the localization map and the second localization map includes calculating a pixel-wise geometric average of the localization map and the second localization map.

Example 10 provides one or more computer-readable media storing instructions executable to perform operations, the operations including receiving an output feature map output by an intermediate layer of a neural network, the neural network including a first layer to receive a representation of an input image and at least one intermediate layer following the first layer; applying a forward transformation to the output feature map to generate an embedding, the forward transformation reducing a dimensionality of the output feature map; performing a reverse transformation of the embedding to generate a reconstructed feature map, the reconstructed feature map having a same dimensionality as the output feature map; determining a feature reconstruction error representing a difference between the output feature map and the reconstructed feature map; and determining a detection score based on the feature reconstruction error, the detection score indicating whether the input image includes out-of-distribution data.

Example 11 provides the one or more computer-readable media of example 10, where applying the forward transformation to the output feature map to generate the embedding includes performing an orthogonal linear transformation on the output feature map, the orthogonal linear transformation calculated from a training dataset using principal component analysis.

Example 12 provides the one or more computer-readable media of example 10, where applying the forward transformation to the output feature map to generate the embedding includes applying a transformation learned from a training dataset using a nonlinear manifold learning technique.

Example 13 provides the one or more computer-readable media of example 10, where applying the forward transformation to the output feature map to generate the embedding includes vectorizing the output feature map to generate a vectorized feature, the vectorized feature having a lower rank than the output feature map; and reducing a dimensionality of the vectorized feature to generate the embedding, where the embedding has fewer elements than the vectorized feature.

Example 14 provides the one or more computer-readable media of example 10, where performing the reverse transformation of the embedding includes applying a pseudo-inverse of the forward transformation to the embedding, where the pseudo-inverse has a same dimensionality as the output feature map.

Example 15 provides the one or more computer-readable media of example 10, the operations further including generating a localization map of the feature reconstruction error, the localization map having dimensions corresponding to the input image, the localization map indicating where, in the input image, the out-of-distribution data is located.

Example 16 provides the one or more computer-readable media of example 15, where the feature reconstruction error is an error vector, and generating the localization map of the feature reconstruction error includes rearranging the error vector to an error tensor, the error tensor having a same dimension as the output feature map; performing a channel-wise averaging of the error tensor to generate the localization map; and resizing the localization map to match the dimensions of the input image.

Example 17 provides the one or more computer-readable media of example 15, the operations further including determining a second feature reconstruction error based on a second output feature map, the second output feature map obtained from an output of a second intermediate layer of the neural network; generating a second localization map of the second feature reconstruction error; and combining the localization map and the second localization map into a combined error localization map.

Example 18 provides the one or more computer-readable media of example 17, where combining the localization map and the second localization map includes calculating a pixel-wise geometric average of the localization map and the second localization map.

Example 19 provides an apparatus that includes a computer processor for executing computer program instructions; and a computer-readable memory storing computer program instructions executable by the computer processor to perform operations including receiving an output feature map output by an intermediate layer of a neural network, the neural network including a first layer to receive a representation of an input image and at least one intermediate layer following the first layer; applying a forward transformation to the output feature map to generate an embedding, the forward transformation reducing a dimensionality of the output feature map; performing a reverse transformation of the embedding to generate a reconstructed feature map, the reconstructed feature map having a same dimensionality as the output feature map; determining a feature reconstruction error representing a difference between the output feature map and the reconstructed feature map; and determining a detection score based on the feature reconstruction error, the detection score indicating whether the input image includes out-of-distribution data.

Example 20 provides the apparatus of example 19, the operations further including generating a localization map of the feature reconstruction error, the localization map having dimensions corresponding to the input image, the localization map indicating where, in the input image, the out-of-distribution data is located.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

What is claimed is:

1. A computer-implemented method, comprising:
receiving an output feature map output by an intermediate layer of a neural network, the neural network comprising a first layer to receive a representation of an input image and at least one intermediate layer following the first layer;
applying a forward transformation to the output feature map to generate an embedding, the forward transformation reducing a dimensionality of the output feature map, wherein applying the forward transformation to the output feature map to generate the embedding comprises vectorizing the output feature map to generate a vectorized feature, the vectorized feature having a lower rank than the output feature map, and reducing a dimensionality of the vectorized feature to generate the embedding, wherein the embedding has fewer elements than the vectorized feature;
performing a reverse transformation of the embedding to generate a reconstructed feature map, the reconstructed feature map having a same dimensionality as the output feature map;
determining a feature reconstruction error representing a difference between the output feature map and the reconstructed feature map; and
determining a detection score based on the feature reconstruction error, the detection score indicating whether the input image includes out-of-distribution data.

2. The computer-implemented method of claim 1, wherein applying the forward transformation to the output feature map to generate the embedding comprises:
performing an orthogonal linear transformation on the output feature map, the orthogonal linear transformation calculated from a training dataset using principal component analysis.

3. The computer-implemented method of claim 1, wherein applying the forward transformation to the output feature map to generate the embedding comprises:
applying a transformation learned from a training dataset using a nonlinear manifold learning technique.

4. The computer-implemented method of claim 1, wherein performing the reverse transformation of the embedding comprises:
applying a pseudo-inverse of the forward transformation to the embedding, wherein the pseudo-inverse has a same dimensionality as the output feature map.

5. The computer-implemented method of claim 1, the method further comprising:
generating a localization map of the feature reconstruction error, the localization map having dimensions corresponding to the input image, the localization map indicating where, in the input image, the out-of-distribution data is located.

6. The computer-implemented method of claim 5, wherein the feature reconstruction error is an error vector, and generating the localization map of the feature reconstruction error comprises:
rearranging the error vector to an error tensor, the error tensor having a same dimension as the output feature map;
performing a channel-wise averaging of the error tensor to generate the localization map; and
resizing the localization map to match the dimensions of the input image.

7. The computer-implemented method of claim 5, the method further comprising:
determining a second feature reconstruction error based on a second output feature map, the second output feature map obtained from an output of a second intermediate layer of the neural network;
generating a second localization map of the second feature reconstruction error; and
combining the localization map and the second localization map into a combined error localization map.

8. The computer-implemented method of claim 7, wherein combining the localization map and the second localization map comprises calculating a pixel-wise geometric average of the localization map and the second localization map.

9. One or more non-transitory computer-readable media storing instructions executable to perform operations, the operations comprising:
receiving an output feature map output by an intermediate layer of a neural network, the neural network comprising a first layer to receive a representation of an input image and at least one intermediate layer following the first layer;
applying a forward transformation to the output feature map to generate an embedding, the forward transformation reducing a dimensionality of the output feature map, wherein applying the forward transformation to the output feature map to generate the embedding comprises vectorizing the output feature map to generate a vectorized feature, the vectorized feature having a lower rank than the output feature map, and reducing a dimensionality of the vectorized feature to generate the embedding, wherein the embedding has fewer elements than the vectorized feature;
performing a reverse transformation of the embedding to generate a reconstructed feature map, the reconstructed feature map having a same dimensionality as the output feature map;
determining a feature reconstruction error representing a difference between the output feature map and the reconstructed feature map; and
determining a detection score based on the feature reconstruction error, the detection score indicating whether the input image includes out-of-distribution data.

10. The one or more non-transitory computer-readable media of claim 9, wherein applying the forward transformation to the output feature map to generate the embedding comprises:
performing an orthogonal linear transformation on the output feature map, the orthogonal linear transformation calculated from a training dataset using principal component analysis.

11. The one or more non-transitory computer-readable media of claim 9, wherein applying the forward transformation to the output feature map to generate the embedding comprises:

applying a transformation learned from a training dataset using a nonlinear manifold learning technique.

12. The one or more non-transitory computer-readable media of claim 9, wherein performing the reverse transformation of the embedding comprises:

applying a pseudo-inverse of the forward transformation to the embedding, wherein the pseudo-inverse has a same dimensionality as the output feature map.

13. The one or more non-transitory computer-readable media of claim 9, the operations further comprising:

generating a localization map of the feature reconstruction error, the localization map having dimensions corresponding to the input image, the localization map indicating where, in the input image, the out-of-distribution data is located.

14. The one or more non-transitory computer-readable media of claim 13, wherein the feature reconstruction error is an error vector, and generating the localization map of the feature reconstruction error comprises:

rearranging the error vector to an error tensor, the error tensor having a same dimension as the output feature map;

performing a channel-wise averaging of the error tensor to generate the localization map; and resizing the localization map to match the dimensions of the input image.

15. The one or more non-transitory computer-readable media of claim 13, the operations further comprising:

determining a second feature reconstruction error based on a second output feature map, the second output feature map obtained from an output of a second intermediate layer of the neural network;

generating a second localization map of the second feature reconstruction error; and combining the localization map and the second localization map into a combined error localization map.

16. The one or more non-transitory computer-readable media of claim 15, wherein combining the localization map and the second localization map comprises calculating a pixel-wise geometric average of the localization map and the second localization map.

17. An apparatus, comprising:

a computer processor for executing computer program instructions; and a computer-readable memory storing computer program instructions executable by the computer processor to perform operations comprising:

receiving an output feature map output by an intermediate layer of a neural network, the neural network comprising a first layer to receive a representation of an input image and at least one intermediate layer following the first layer;

applying a forward transformation to the output feature map to generate an embedding, the forward transformation reducing a dimensionality of the output feature map, wherein applying the forward transformation to the output feature map to generate the embedding comprises vectorizing the output feature map to generate a vectorized feature, the vectorized feature having a lower rank than the output feature map, and reducing a dimensionality of the vectorized feature to generate the embedding, wherein the embedding has fewer elements than the vectorized feature;

performing a reverse transformation of the embedding to generate a reconstructed feature map, the reconstructed feature map having a same dimensionality as the output feature map;

determining a feature reconstruction error representing a difference between the output feature map and the reconstructed feature map; and determining a detection score based on the feature reconstruction error, the detection score indicating whether the input image includes out-of-distribution data.

18. The apparatus of claim 17, the operations further comprising:

generating a localization map of the feature reconstruction error, the localization map having dimensions corresponding to the input image, the localization map indicating where, in the input image, the out-of-distribution data is located.

19. The apparatus of claim 17, the operations further comprising:

generating a localization map of the feature reconstruction error, the localization map having dimensions corresponding to the input image, the localization map indicating where, in the input image, the out-of-distribution data is located.

20. The apparatus of claim 19, wherein the feature reconstruction error is an error vector, and generating the localization map of the feature reconstruction error comprises:

rearranging the error vector to an error tensor, the error tensor having a same dimension as the output feature map;

performing a channel-wise averaging of the error tensor to generate the localization map; and resizing the localization map to match the dimensions of the input image.

* * * * *